United States Patent
Jacob et al.

(10) Patent No.: US 11,386,218 B2
(45) Date of Patent: *Jul. 12, 2022

(54) PLATFORM MANAGEMENT OF INTEGRATED ACCESS OF PUBLIC AND PRIVATELY-ACCESSIBLE DATASETS UTILIZING FEDERATED QUERY GENERATION AND QUERY SCHEMA REWRITING OPTIMIZATION

(71) Applicant: data.world, Inc., Austin, TX (US)

(72) Inventors: Bryon Kristen Jacob, Austin, TX (US); David Lee Griffith, Austin, TX (US); Triet Minh Le, Austin, TX (US); Shad William Reynolds, Austin, TX (US); Arthur Albert Keen, Austin, TX (US)

(73) Assignee: data.world, Inc., Austin, TX (US)

( * ) Notice: Subject to any disclaimer, the term of this patent is extended or adjusted under 35 U.S.C. 154(b) by 401 days.

This patent is subject to a terminal disclaimer.

(21) Appl. No.: 16/457,759

(22) Filed: Jun. 28, 2019

(65) Prior Publication Data

US 2020/0218723 A1 Jul. 9, 2020

Related U.S. Application Data

(63) Continuation of application No. 15/439,911, filed on Feb. 22, 2017, now Pat. No. 10,438,013, and a
(Continued)

(51) Int. Cl.
*G06F 16/242* (2019.01)
*G06F 16/2453* (2019.01)
(Continued)

(52) U.S. Cl.
CPC ........ *G06F 21/6218* (2013.01); *G06F 16/213* (2019.01); *G06F 16/2423* (2019.01);
(Continued)

(58) Field of Classification Search
CPC ............. G06F 21/6218; G06F 21/6227; G06F 16/24534; G06F 16/24542; G06F 16/213;
(Continued)

(56) References Cited

U.S. PATENT DOCUMENTS 6,144,962 A 11/2000 Weinberg et al.
6,317,752 B1 11/2001 Lee et al.
(Continued)

FOREIGN PATENT DOCUMENTS

AU 2012289936 A1 2/2014
CA 2820994 A1 1/2014
(Continued)

OTHER PUBLICATIONS

"Data.World Comes Out Of Stealth To Make Open Data Easier." Americaninno.com, AustinInno, Jul. 11, 2016, www.americaninno.com/austin/open-data-tech-brett-hurts-startup-data-world-launches/.
(Continued)

*Primary Examiner* — Joshua Bullock
(74) *Attorney, Agent, or Firm* — Kokka & Backus, PC

(57) ABSTRACT

Various techniques are described for platform management of integrated access of public and privately-accessible datasets utilizing federated query generation and query schema rewriting optimization, including receiving at a dataset access platform a query formatted according to a first data schema, generating a copy of the query, saving the query and the copy to a datastore, parsing the copy of the query in the first schema using an inference engine, determining whether the query comprises data associated with an access control condition associated with accessing the dataset, the access control condition being configured to indicate whether the query is permitted to access the dataset, and rewriting, using a proxy server, the copy of the query in a second schema,
(Continued)

and optimizing the rewriting by identifying a database engine to execute the query and including other data converted into another triple associated with an attribute of the query.

20 Claims, 12 Drawing Sheets

Related U.S. Application Data continuation of application No. 16/428,456, filed on May 31, 2019, now Pat. No. 11,093,633, said application No. 15/439,911 is a continuation-in-part of application No. 15/186,514, filed on Jun. 19, 2016, now Pat. No. 10,102,258, and a continuation-in-part of application No. 15/186,515, filed on Jun. 19, 2016, now Pat. No. 10,515,085, and a continuation-in-part of application No. 15/186,516, filed on Jun. 19, 2016, now Pat. No. 10,452,677, and a continuation-in-part of application No. 15/186,517, filed on Jun. 19, 2016, now Pat. No. 10,324,925, and a continuation-in-part of application No. 15/186,519, filed on Jun. 19, 2016, now Pat. No. 10,699,027, and a continuation-in-part of application No. 15/186,520, filed on Jun. 19, 2016, now Pat. No. 10,346,429.

(51) Int. Cl.
| | | |
|---|---|---|
| *G06F 16/21* | (2019.01) | |
| *G06F 16/901* | (2019.01) | |
| *G06F 21/62* | (2013.01) | |
| *G06N 5/04* | (2006.01) | |
| *G06N 3/08* | (2006.01) | |
| *G06N 5/02* | (2006.01) | |

(52) U.S. Cl.
CPC .. *G06F 16/24534* (2019.01); *G06F 16/24542* (2019.01); *G06F 16/9024* (2019.01); *G06F 21/6227* (2013.01); *G06N 3/08* (2013.01); *G06N 5/022* (2013.01); *G06N 5/04* (2013.01)

(58) Field of Classification Search
CPC ... G06F 16/2423; G06F 16/9024; G06N 3/08; G06N 5/022; G06N 5/04
USPC ......................................................... 707/755
See application file for complete search history.

(56) References Cited

U.S. PATENT DOCUMENTS

| | | | |
|---|---|---|---|
| 6,529,909 | B1 | 3/2003 | Bowman-Amuah |
| 6,768,986 | B2 | 7/2004 | Cras et al. |
| 6,961,728 | B2 | 11/2005 | Wynblatt et al. |
| 7,080,090 | B2 | 7/2006 | Shah et al. |
| 7,146,375 | B2 | 12/2006 | Egilsson et al. |
| 7,680,862 | B2 | 3/2010 | Chong et al. |
| 7,702,639 | B2 | 4/2010 | Stanley et al. |
| 7,761,407 | B1 | 7/2010 | Stern |
| 7,836,063 | B2 | 11/2010 | Salazar et al. |
| 7,853,081 | B2 | 12/2010 | Thint |
| 7,856,416 | B2 | 12/2010 | Hoffman et al. |
| 7,877,350 | B2 | 1/2011 | Stanfill et al. |
| 7,953,695 | B2 | 5/2011 | Roller et al. |
| 7,987,179 | B2 | 7/2011 | Ma et al. |
| 8,037,108 | B1 | 10/2011 | Chang |
| 8,060,472 | B2 | 11/2011 | Itai et al. |
| 8,099,382 | B2 | 1/2012 | Liu et al. |
| 8,170,981 | B1 | 5/2012 | Tewksbary |
| 8,275,784 | B2 | 9/2012 | Cao et al. |
| 8,296,200 | B2 | 10/2012 | Mangipudi et al. |
| 8,312,389 | B2 | 11/2012 | Crawford et al. |
| 8,429,179 | B1 | 4/2013 | Mirhaji |
| 8,521,565 | B2 | 8/2013 | Faulkner et al. |
| 8,538,985 | B2 | 9/2013 | Betawadkar-Norwood et al. |
| 8,583,631 | B1 | 11/2013 | Ganapathi et al. |
| 8,616,443 | B2 | 12/2013 | Butt et al. |
| 8,640,056 | B2 | 1/2014 | Helfman et al. |
| 8,719,252 | B2 | 5/2014 | Miranker et al. |
| 8,762,160 | B2 | 6/2014 | Lulla |
| 8,799,240 | B2 | 8/2014 | Stowe et al. |
| 8,831,070 | B2 | 9/2014 | Huang et al. |
| 8,843,502 | B2 | 9/2014 | Elson et al. |
| 8,856,643 | B2 | 10/2014 | Drieschner |
| 8,892,513 | B2 | 11/2014 | Forsythe |
| 8,935,272 | B2 | 1/2015 | Ganti et al. |
| 8,943,313 | B2 | 1/2015 | Glew et al. |
| 8,965,915 | B2 | 2/2015 | Ganti et al. |
| 8,990,236 | B2 | 3/2015 | Mizrahy et al. |
| 8,996,559 | B2 | 3/2015 | Ganti et al. |
| 8,996,978 | B2 | 3/2015 | Richstein et al. |
| 9,002,860 | B1 | 4/2015 | Ghemawat |
| 9,171,077 | B2 | 10/2015 | Balmin et al. |
| 9,218,365 | B2 | 12/2015 | Irani et al. |
| 9,244,952 | B2 | 1/2016 | Ganti et al. |
| 9,268,820 | B2 | 2/2016 | Henry |
| 9,268,950 | B2 | 2/2016 | Gkoulalas-Divanis et al. |
| 9,396,283 | B2 | 7/2016 | Miranker et al. |
| 9,454,611 | B2 | 9/2016 | Henry |
| 9,495,429 | B2 | 11/2016 | Miranker |
| 9,560,026 | B1 | 1/2017 | Worsley |
| 9,607,042 | B2 | 3/2017 | Long |
| 9,613,152 | B2 | 4/2017 | Kucera |
| 9,659,081 | B1 | 5/2017 | Ghodsi et al. |
| 9,690,792 | B2 | 6/2017 | Bartlett et al. |
| 9,696,981 | B2 | 7/2017 | Martin et al. |
| 9,710,526 | B2 | 7/2017 | Couris et al. |
| 9,710,568 | B2 | 7/2017 | Srinivasan et al. |
| 9,720,958 | B2 | 8/2017 | Bagehorn et al. |
| 9,760,602 | B1 | 9/2017 | Ghodsi et al. |
| 9,769,032 | B1 | 9/2017 | Ghodsi et al. |
| 9,798,737 | B2 | 10/2017 | Palmer |
| 9,836,302 | B1 | 12/2017 | Hunter et al. |
| 9,959,337 | B2 | 5/2018 | Ghodsi et al. |
| 9,990,230 | B1 | 6/2018 | Stoica et al. |
| 10,095,735 | B2 | 10/2018 | Ghodsi et al. |
| 10,102,258 | B2 | 10/2018 | Jacob et al. |
| 10,176,234 | B2 | 1/2019 | Gould et al. |
| 10,216,860 | B2 | 2/2019 | Miranker et al. |
| 10,248,297 | B2 | 4/2019 | Beechuk et al. |
| 10,296,329 | B2 | 5/2019 | Hunter et al. |
| 10,318,567 | B2 | 6/2019 | Henry |
| 10,324,925 | B2 | 6/2019 | Jacob et al. |
| 10,361,928 | B2 | 7/2019 | Ghodsi et al. |
| 10,438,013 | B2 | 10/2019 | Jacob et al. |
| 10,452,677 | B2 | 10/2019 | Jacob et al. |
| 10,452,975 | B2 | 10/2019 | Jacob et al. |
| 10,474,501 | B2 | 11/2019 | Ghodsi et al. |
| 10,474,736 | B1 | 11/2019 | Stoica et al. |
| 10,545,986 | B2 | 1/2020 | Tappan et al. |
| 10,546,001 | B1 | 1/2020 | Nguyen et al. |
| D876,454 | S | 2/2020 | Knowles et al. |
| 10,558,664 | B2 | 2/2020 | Armbrust et al. |
| D877,167 | S | 3/2020 | Knowles et al. |
| D879,112 | S | 3/2020 | Hejazi et al. |
| 10,606,675 | B1 | 3/2020 | Luszczak et al. |
| 10,645,548 | B2 | 5/2020 | Reynolds et al. |
| 10,664,509 | B1 | 5/2020 | Reeves et al. |
| 10,673,887 | B2 | 6/2020 | Crabtree et al. |
| 10,678,536 | B2 | 6/2020 | Hunter et al. |
| 10,691,299 | B2 | 6/2020 | Broek et al. |
| 10,691,433 | B2 | 6/2020 | Shankar et al. |
| 10,769,130 | B1 | 9/2020 | Armbrust et al. |
| 10,769,535 | B2 | 9/2020 | Lindsley |
| 10,810,051 | B1 | 10/2020 | Shankar et al. |
| 10,984,008 | B2 | 4/2021 | Jacob et al. |
| 11,068,453 | B2 | 7/2021 | Griffith |
| 11,068,475 | B2 | 7/2021 | Boutros et al. |
| 11,068,847 | B2 | 7/2021 | Boutros et al. |
| 11,093,539 | B2 | 8/2021 | Henry |
| 2002/0133476 | A1 | 9/2002 | Reinhardt |

(56) References Cited

U.S. PATENT DOCUMENTS

| | | |
|---|---|---|
| 2002/0143755 A1 | 10/2002 | Wynblatt et al. |
| 2003/0093597 A1 | 5/2003 | Marshak et al. |
| 2003/0120681 A1 | 6/2003 | Baclawski |
| 2003/0208506 A1 | 11/2003 | Greenfield et al. |
| 2004/0064456 A1 | 4/2004 | Fong et al. |
| 2005/0004888 A1 | 1/2005 | McCrady et al. |
| 2005/0010550 A1 | 1/2005 | Potter et al. |
| 2005/0010566 A1 | 1/2005 | Cushing et al. |
| 2005/0234957 A1 | 10/2005 | Olson et al. |
| 2005/0246357 A1 | 11/2005 | Geary et al. |
| 2005/0278139 A1 | 12/2005 | Glaenzer et al. |
| 2006/0100995 A1 | 5/2006 | Albornoz et al. |
| 2006/0117057 A1 | 6/2006 | Legault et al. |
| 2006/0129605 A1 | 6/2006 | Doshi |
| 2006/0161545 A1 | 7/2006 | Pura |
| 2006/0168002 A1 | 7/2006 | Chesley |
| 2006/0218024 A1 | 9/2006 | Lulla |
| 2006/0235837 A1 | 10/2006 | Chong et al. |
| 2007/0027904 A1 | 2/2007 | Chow et al. |
| 2007/0055662 A1 | 3/2007 | Edelman et al. |
| 2007/0139227 A1 | 6/2007 | Speirs et al. |
| 2007/0179760 A1 | 8/2007 | Smith |
| 2007/0203933 A1 | 8/2007 | Iversen et al. |
| 2007/0271604 A1 | 11/2007 | Webster et al. |
| 2007/0276875 A1 | 11/2007 | Brunswig et al. |
| 2008/0046427 A1 | 2/2008 | Lee et al. |
| 2008/0091634 A1 | 4/2008 | Seeman |
| 2008/0140609 A1 | 6/2008 | Werner et al. |
| 2008/0162550 A1 | 7/2008 | Fey |
| 2008/0162999 A1 | 7/2008 | Schlueter et al. |
| 2008/0216060 A1 | 9/2008 | Vargas |
| 2008/0240566 A1 | 10/2008 | Thint |
| 2008/0256026 A1 | 10/2008 | Hays |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0013281 A1 | 1/2009 | Helfman et al. |
| 2009/0018996 A1 | 1/2009 | Hunt et al. |
| 2009/0064053 A1 | 3/2009 | Crawford et al. |
| 2009/0094416 A1 | 4/2009 | Baeza-Yates et al. |
| 2009/0106734 A1 | 4/2009 | Riesen et al. |
| 2009/0119254 A1 | 5/2009 | Cross et al. |
| 2009/0132474 A1 | 5/2009 | Ma et al. |
| 2009/0132503 A1 | 5/2009 | Sun et al. |
| 2009/0138437 A1 | 5/2009 | Krishnamoorthy et al. |
| 2009/0150313 A1 | 6/2009 | Heilper et al. |
| 2009/0157630 A1 | 6/2009 | Yuan |
| 2009/0182710 A1 | 7/2009 | Short et al. |
| 2009/0198693 A1 | 8/2009 | Pura |
| 2009/0234799 A1* | 9/2009 | Betawadkar-Norwood ................ G06F 16/2471 |
| 2009/0300054 A1 | 12/2009 | Fisher et al. |
| 2010/0114885 A1 | 5/2010 | Bowers et al. |
| 2010/0138388 A1 | 6/2010 | Wakeling et al. |
| 2010/0223266 A1 | 9/2010 | Balmin et al. |
| 2010/0235384 A1 | 9/2010 | Itai et al. |
| 2010/0241644 A1 | 9/2010 | Jackson et al. |
| 2010/0250576 A1 | 9/2010 | Bowers et al. |
| 2010/0250577 A1 | 9/2010 | Cao et al. |
| 2010/0268722 A1 | 10/2010 | Yalamanchi et al. |
| 2010/0332453 A1 | 12/2010 | Prahlad et al. |
| 2011/0153047 A1 | 6/2011 | Cameron et al. |
| 2011/0202560 A1 | 8/2011 | Bowers et al. |
| 2011/0283231 A1 | 11/2011 | Richstein et al. |
| 2011/0298804 A1 | 12/2011 | Hao et al. |
| 2012/0016895 A1 | 1/2012 | Butt et al. |
| 2012/0036162 A1 | 2/2012 | Gimbel |
| 2012/0102022 A1 | 4/2012 | Miranker et al. |
| 2012/0154633 A1 | 6/2012 | Rodriguez |
| 2012/0179644 A1 | 7/2012 | Miranker |
| 2012/0190386 A1 | 7/2012 | Anderson |
| 2012/0254192 A1 | 10/2012 | Gelbard |
| 2012/0278902 A1 | 11/2012 | Martin et al. |
| 2012/0284301 A1 | 11/2012 | Mizrahy et al. |
| 2012/0310674 A1 | 12/2012 | Faulkner et al. |
| 2012/0330908 A1 | 12/2012 | Stowe et al. |
| 2012/0330979 A1 | 12/2012 | Elson et al. |
| 2013/0031208 A1 | 1/2013 | Linton et al. |
| 2013/0031364 A1 | 1/2013 | Glew et al. |
| 2013/0041893 A1 | 2/2013 | Strike |
| 2013/0054517 A1 | 2/2013 | Beechuk et al. |
| 2013/0110775 A1 | 5/2013 | Forsythe |
| 2013/0110825 A1 | 5/2013 | Henry |
| 2013/0114645 A1 | 5/2013 | Huang et al. |
| 2013/0138681 A1 | 5/2013 | Abrams et al. |
| 2013/0156348 A1 | 6/2013 | Irani et al. |
| 2013/0238667 A1 | 9/2013 | Carvalho et al. |
| 2013/0262443 A1 | 10/2013 | Leida et al. |
| 2013/0263019 A1 | 10/2013 | Castellanos et al. |
| 2013/0321458 A1 | 12/2013 | Miserendino et al. |
| 2014/0006448 A1 | 1/2014 | McCall |
| 2014/0019426 A1* | 1/2014 | Palmer .................. G06F 16/256 707/694 |
| 2014/0067762 A1 | 3/2014 | Carvalho |
| 2014/0115013 A1 | 4/2014 | Anderson |
| 2014/0119611 A1 | 5/2014 | Prevrhal et al. |
| 2014/0164431 A1 | 6/2014 | Tolbert |
| 2014/0198097 A1 | 7/2014 | Evans |
| 2014/0214857 A1 | 7/2014 | Srinivasan et al. |
| 2014/0229869 A1 | 8/2014 | Chiantera et al. |
| 2014/0236933 A1 | 8/2014 | Schoenbach et al. |
| 2014/0244623 A1 | 8/2014 | King |
| 2014/0279640 A1 | 9/2014 | Moreno et al. |
| 2014/0279845 A1 | 9/2014 | Ganti et al. |
| 2014/0280067 A1 | 9/2014 | Ganti et al. |
| 2014/0280286 A1 | 9/2014 | Ganti et al. |
| 2014/0280287 A1 | 9/2014 | Ganti et al. |
| 2014/0337331 A1 | 11/2014 | Hassanzadeh et al. |
| 2014/0337436 A1 | 11/2014 | Hoagland et al. |
| 2014/0372434 A1 | 12/2014 | Smith et al. |
| 2015/0046547 A1 | 2/2015 | Vohra et al. |
| 2015/0052125 A1 | 2/2015 | Ellis et al. |
| 2015/0052134 A1 | 2/2015 | Bornea et al. |
| 2015/0081666 A1* | 3/2015 | Long .................. G06F 16/2453 707/713 |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0143248 A1 | 5/2015 | Beechuk et al. |
| 2015/0149879 A1 | 5/2015 | Miller et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0242867 A1 | 8/2015 | Prendergast et al. |
| 2015/0269223 A1 | 9/2015 | Miranker et al. |
| 2015/0277725 A1 | 10/2015 | Masterson et al. |
| 2015/0278273 A1 | 10/2015 | Wigington et al. |
| 2015/0278335 A1 | 10/2015 | Opitz et al. |
| 2015/0339572 A1 | 11/2015 | Achin et al. |
| 2015/0356144 A1 | 12/2015 | Chawla et al. |
| 2015/0372915 A1 | 12/2015 | Shen et al. |
| 2015/0379079 A1 | 12/2015 | Kota |
| 2016/0004820 A1 | 1/2016 | Moore |
| 2016/0012059 A1 | 1/2016 | Balmin et al. |
| 2016/0019091 A1 | 1/2016 | Leber et al. |
| 2016/0055184 A1 | 2/2016 | Fokoue-Nkoutche et al. |
| 2016/0055261 A1 | 2/2016 | Reinhardt et al. |
| 2016/0063017 A1* | 3/2016 | Bartlett .................. G06F 16/245 707/759 |
| 2016/0063271 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0092476 A1 | 3/2016 | Stojanovic et al. |
| 2016/0098418 A1 | 4/2016 | Dakshinamurthy et al. |
| 2016/0100009 A1 | 4/2016 | Zoldi et al. |
| 2016/0117358 A1 | 4/2016 | Schmid et al. |
| 2016/0117362 A1 | 4/2016 | Bagehorn et al. |
| 2016/0132572 A1 | 5/2016 | Chang et al. |
| 2016/0132608 A1 | 5/2016 | Rathod |
| 2016/0132787 A1 | 5/2016 | Drevo et al. |
| 2016/0147837 A1* | 5/2016 | Nguyen .................. G06F 16/245 707/771 |
| 2016/0162785 A1 | 6/2016 | Grobman |

(56) References Cited

U.S. PATENT DOCUMENTS

| | | |
|---|---|---|
| 2016/0171380 A1 | 6/2016 | Kennel et al. |
| 2016/0173338 A1 | 6/2016 | Wolting |
| 2016/0188789 A1 | 6/2016 | Kisiel et al. |
| 2016/0203196 A1 | 7/2016 | Schnall-Levin et al. |
| 2016/0210364 A1 | 7/2016 | Henry |
| 2016/0232457 A1 | 8/2016 | Gray et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0350414 A1 | 12/2016 | Henry |
| 2016/0358102 A1 | 12/2016 | Bowers et al. |
| 2016/0358103 A1 | 12/2016 | Bowers et al. |
| 2016/0371288 A1 | 12/2016 | Biannic et al. |
| 2016/0371355 A1 | 12/2016 | Massari et al. |
| 2017/0017537 A1 | 1/2017 | Razin et al. |
| 2017/0032259 A1 | 2/2017 | Goranson et al. |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1* | 6/2017 | Simitsis ............ G06F 16/248 |
| 2017/0161341 A1 | 6/2017 | Hrabovsky et al. |
| 2017/0177729 A1 | 6/2017 | Duke et al. |
| 2017/0213004 A1 | 7/2017 | Fox et al. |
| 2017/0220615 A1 | 8/2017 | Bendig et al. |
| 2017/0220667 A1 | 8/2017 | Ghodsi et al. |
| 2017/0228405 A1 | 8/2017 | Ward et al. |
| 2017/0236060 A1 | 8/2017 | Ignatyev |
| 2017/0316070 A1 | 11/2017 | Krishnan et al. |
| 2017/0318020 A1 | 11/2017 | Kamath et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2017/0371926 A1 | 12/2017 | Shiran et al. |
| 2018/0025027 A1 | 1/2018 | Palmer |
| 2018/0025307 A1 | 1/2018 | Hui et al. |
| 2018/0032327 A1 | 2/2018 | Adami et al. |
| 2018/0040077 A1 | 2/2018 | Smith et al. |
| 2018/0046668 A1 | 2/2018 | Ghodsi et al. |
| 2018/0048536 A1 | 2/2018 | Ghodsi et al. |
| 2018/0121194 A1 | 5/2018 | Hunter et al. |
| 2018/0210936 A1 | 7/2018 | Reynolds et al. |
| 2018/0262864 A1 | 9/2018 | Reynolds et al. |
| 2018/0300354 A1 | 10/2018 | Liang et al. |
| 2018/0300494 A1 | 10/2018 | Avidan et al. |
| 2018/0314556 A1 | 11/2018 | Ghodsi et al. |
| 2018/0314705 A1 | 11/2018 | Griffith et al. |
| 2018/0314732 A1 | 11/2018 | Armbrust et al. |
| 2018/0330111 A1 | 11/2018 | Käbisch et al. |
| 2019/0005104 A1 | 1/2019 | Prabhu et al. |
| 2019/0034491 A1 | 1/2019 | Griffith et al. |
| 2019/0042606 A1 | 2/2019 | Griffith et al. |
| 2019/0050445 A1 | 2/2019 | Griffith et al. |
| 2019/0050459 A1 | 2/2019 | Griffith et al. |
| 2019/0057107 A1 | 2/2019 | Bartlett et al. |
| 2019/0065567 A1 | 2/2019 | Griffith et al. |
| 2019/0065569 A1 | 2/2019 | Boutros et al. |
| 2019/0066052 A1 | 2/2019 | Boutros et al. |
| 2019/0079968 A1 | 3/2019 | Griffith et al. |
| 2019/0095472 A1 | 3/2019 | Griffith |
| 2019/0121807 A1 | 4/2019 | Boutros et al. |
| 2019/0155852 A1 | 5/2019 | Miranker et al. |
| 2019/0258479 A1 | 8/2019 | Hunter et al. |
| 2019/0266155 A1 | 8/2019 | Jacob et al. |
| 2019/0272279 A1 | 9/2019 | Jacob et al. |
| 2019/0278793 A1 | 9/2019 | Henry |
| 2019/0295296 A1 | 9/2019 | Gove, Jr. |
| 2019/0317961 A1 | 10/2019 | Brener et al. |
| 2019/0332606 A1 | 10/2019 | Kee et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1 | 11/2019 | Griffith |
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2020/0073644 A1 | 3/2020 | Shankar et al. |
| 2020/0073865 A1 | 3/2020 | Jacob et al. |
| 2020/0074298 A1 | 3/2020 | Jacob et al. |
| 2020/0097504 A1 | 3/2020 | Sequeda et al. |
| 2020/0117665 A1 | 4/2020 | Jacob et al. |
| 2020/0117688 A1 | 4/2020 | Sequeda et al. |
| 2020/0175012 A1 | 6/2020 | Jacob et al. |
| 2020/0175013 A1 | 6/2020 | Jacob et al. |
| 2020/0201854 A1 | 6/2020 | Miller |
| 2020/0241950 A1 | 7/2020 | Luszczak et al. |
| 2020/0252766 A1 | 8/2020 | Reynolds et al. |
| 2020/0252767 A1 | 8/2020 | Reynolds et al. |
| 2020/0257689 A1 | 8/2020 | Armbrust et al. |
| 2020/0301684 A1 | 9/2020 | Shankar et al. |
| 2020/0409768 A1 | 12/2020 | Shankar et al. |
| 2021/0011901 A1 | 1/2021 | Armbrust et al. |
| 2021/0019327 A1 | 1/2021 | Reynolds et al. |
| 2021/0042299 A1 | 2/2021 | Migliori |
| 2021/0081414 A1 | 3/2021 | Jacob et al. |
| 2021/0109629 A1 | 4/2021 | Reynolds et al. |
| 2021/0173848 A1 | 6/2021 | Jacob et al. |
| 2021/0224250 A1 | 7/2021 | Griffith |
| 2021/0224330 A1 | 7/2021 | Miranker et al. |
| 2021/0294465 A1 | 9/2021 | Reynolds et al. |
| 2021/0374171 A1 | 12/2021 | Henry |
| 2021/0390098 A1 | 12/2021 | Reynolds et al. |
| 2021/0390141 A1 | 12/2021 | Jacob et al. |
| 2021/0390507 A1 | 12/2021 | Reynolds et al. |
| 2021/0397589 A1 | 12/2021 | Griffith et al. |
| 2021/0397611 A1 | 12/2021 | Boutres et al. |
| 2021/0397626 A1 | 12/2021 | Griffith et al. |

FOREIGN PATENT DOCUMENTS

| | | |
|---|---|---|
| CN | 103425734 B | 6/2017 |
| EP | 2631817 A1 | 8/2013 |
| EP | 2631819 A1 | 8/2013 |
| EP | 2685394 A3 | 6/2017 |
| EP | 2740053 B1 | 6/2019 |
| GB | 2519779 A | 5/2015 |
| JP | 2013175181 A | 9/2013 |
| JP | 2013246828 A | 12/2013 |
| JP | 2014524124 A | 9/2014 |
| WO | 2012054860 A1 | 4/2012 |
| WO | 2013020084 A1 | 2/2013 |
| WO | 2017190153 A1 | 11/2017 |
| WO | 2017222927 A1 | 12/2017 |
| WO | 2018156551 A1 | 8/2018 |
| WO | 2018164971 A1 | 9/2018 |
| WO | 2021252805 A1 | 12/2021 |

OTHER PUBLICATIONS

Dwivedi, Mahesh H., Non-Final Office Action dated Jan. 30, 2020 for U.S. Appl. No. 15/454,955.
Gillin, Paul, "Neo4j Connector Integrates Graph Data With Business Intelligence Tools," SiliconANGLE, Published Mar. 24, 2020, Retrieved from on Mar. 25, 2020.
Raab, Christopher J., Non-Final Office Action dated Jul. 24, 2020 for U.S. Appl. No. 16/271,687.
Woo, Isaac M., Non-Final Office Action dated May 5, 2020 for U.S. Appl. No. 16/137,292.
Yotova, Polina, Supplementary European Search Report and Examiner Search Opinion for European Patent Application No. 17815970. 3, dated Feb. 21, 2020.

(56) References Cited

OTHER PUBLICATIONS

Hu, Xiaoqin, Final Office Action dated Oct. 31, 2019 for U.S. Appl. No. 15/454,969.
Hu, Xiaoqin, Final Office Action dated Sep. 24, 2019 for U.S. Appl. No. 15/454,981.
Hu, Xiaoqin, Non-Final Office Action dated Aug. 1, 2019 for U.S. Appl. No. 15/454,981.
Hu, Xiaoqin, Non-Final Office Action dated Jul. 26, 2019 for U.S. Appl. No. 15/454,969.
Yen, Syling, Final Office Action dated Oct. 25, 2019 for U.S. Appl. No. 15/186,519.
Yen, Syling, Non-Final Office Action dated Sep. 12, 2019 for U.S. Appl. No. 15/186,519.
Angles, R., Gutierrez. C., "The Expressive Power of SPARQL," Proceedings of the 7th International Semantic Web Conference (ISWC2008). 2008.
Arenas, M., et al., "A Direct Mapping of Relational Data to RDF," W3C Recommendation, Sep. 27, 2012, Retrieved from the Internet [retrieved Mar. 7, 2019].
Beckett, D., Berners-Lee, T., "Turtle—Terse RDF Triple Language," W3C Team Submission, Jan. 14, 2008, Retrieved from the Internet [retrieved Mar. 7, 2019].
Beckett, D., Broekstra, J., "SPARQL Query Results XML Format," W3C Recommendation, Jan. 15, 2008, Retrieved from the Internet [retrieved Mar. 7, 2019].
Beckett, Dave, "RDF/XML Syntax Specification (Revised)," W3C Recommendation, Feb. 10, 2004, Retrieved from the Internet [retrieved Mar. 7, 2019].
Berners-Lee, Tim, "Notation 3," 2006, Retrieved from the Internet [retrieved on Mar. 7, 2019].
Berners-Lee, Tim, "Linked Data," 2009, Retrieved from the Internet [retrieved on Mar. 7, 2019].
Brickley, D., Guha, R.V., "RDF Vocabulary Description Language 1.0: RDF Schema," W3C Recommendation, Feb. 10, 2004, Retrieved from the Internet [retrieved Mar. 7, 2019].
Buche et al., "Flexible SPARQL Querying of Web Data Tables Driven by an Ontology," FQAS 2009, LNAI 5822, Springer, 2009, pp. 345-357.
Bullock, Joshua, Final Office Action dated Jan. 22, 2019 for U.S. Appl. No. 15/439,908.
Bullock, Joshua, Final Office Action dated Jan. 22, 2019 for U.S. Appl. No. 15/439,911.
Bullock, Joshua, Final Office Action dated Oct. 30, 2018 for U.S. Appl. No. 15/186,517.
Bullock, Joshua, Non-Final Office Action dated Jul. 12, 2018 for U.S. Appl. No. 15/186,517.
Bullock, Joshua, Non-Final Office Action dated Jun. 28, 2018 for U.S. Appl. No. 15/439,908.
Bullock, Joshua, Non-Final Office Action dated Jun. 28, 2018 for U.S. Appl. No. 15/439,911.
Clark, K., Feigenbaum, L., Torres, E., "SPARQL Protocol for RDF," W3C Recommendation, Jan. 15, 2008, Retrieved from the Internet [retrieved Mar. 7, 2019].
Copenheaver, Blaine R., Notification of Transmittal of the International Search Report and the Written Opinion of the International Searching Authority, or the Declaration dated Jul. 5, 2017 for International Patent Application No. PCT/US2017/030474.
Czajkowski, K., et al., "Grid Information Services for Distributed Resource Sharing," 10th IEEE International Symposium on High Performance Distributed Computing, pp. 181-184. IEEE Press, New York (2001).
Dean, M., Schreiber, G., "OWL Web Ontology Language Reference," W3C Recommendation, Feb. 10, 2004, Retrieved from the Internet [retrieved Mar. 7, 2019].
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.

Foster, I., Kesselman, C., "The Grid: Blueprint for a New Computing Infrastructure," Morgan Kaufmann, San Francisco (1999).
Foster, I., Kesselman, C., Nick, J., Tuecke, S., "The Physiology of the Grid: An Open Grid Services Architecture for Distributed Systems Integration," Technical Report, Global Grid Forum (2002).
Ganti et al., U.S. Appl. No. 14/058,184, filed Oct. 18, 2013 and entitled, "Assisted Query Formation, Validation, and Result Previewing in a Database Having a Complex Schema."
Ganti et al., U.S. Appl. No. 14/058,189, filed Oct. 18, 2013 and entitled, "Assisted Query Formation, Validation, and Result Previewing in a Database Having a Complex Schema."
Ganti et al., U.S. Appl. No. 14/058,206, filed Oct. 18, 2013 and entitled, "Curated Answers Community Automatically Populated Through User Query Monitoring."
Ganti et al., U.S. Appl. No. 14/058,208, filed Oct. 18, 2013 and entitled, "Editable and Searchable Markup Pages Automatically Populated Through User Query Monitoring."
Ganti et al., U.S. Appl. No. 61/802,716, filed Mar. 17, 2013 and entitled, "Data Profile Driven Query Builder."
Ganti et al., U.S. Appl. No. 61/802,742, filed Mar. 18, 2013 and entitled, "Developing a Social Data Catalog By Crowd-Sourcing."
Ganti et al., U.S. Appl. No. 61/802,743, filed Mar. 18, 2013 and entitled, "Creating a Data Catalog By Mining Queries."
Ganti et al., U.S. Appl. No. 61/802,744, filed Mar. 18, 2013 and entitled, "Autocompletion of Queries With Data Object Names and Data Profiles."
Garcia-Molina, H., Ullman, J., Widom, J., Database Systems: The Complete Book. Editorial Pearson Prentice Hall. Second Edition.
Gawinecki, Maciej, "How schema mapping can help in data integration?—integrating the relational databases with ontologies," ITC School, Computer Science, XXIII Cycle DII, University of Modena and Reggio Emilia, Italy, 2008.
Girma, Anteneh B., Final Office Action for U.S. Appl. No. 13/278,907, dated Apr. 18, 2013.
Girma, Anteneh B., Non-Final Office Action for U.S. Appl. No. 13/278,907, dated Jul. 25, 2012.
Grant, J., Beckett, D., "RDF Test Cases," W3C Recommendation, Feb. 10, 2004, Retrieved from the Internet [retrieved Mar. 7, 2019].
Haveliwala et al., "Evaluating Strategies for Similarity Search on the Web," Proceedings of the 11th international conference on World Wide Web, May 7-11, 2002, Honolulu, Hawaii, USA (ACM), p. 432-442.
Hayes, Patrick, "RDF Semantics," W3C Recommendation, Feb. 10, 2004, Retrieved from the Internet [retrieved Mar. 7, 2019].
Heflin, J., "OWL Web Ontology Language Use Cases and Requirements," W3C Recommendation, Feb. 10, 2004, Retrieved from the Internet [retrieved Mar. 7, 2019].
Hoang, Hau Hai, Final Office Action dated Nov. 26, 2018 for U.S. Appl. No. 15/186,515.
Hoang, Hau Hai, Non-Final Office Action dated Apr. 16, 2019 for U.S. Appl. No. 15/186,515.
Hoang, Hau Hai, Non-Final Office Action dated May 3, 2018 for U.S. Appl. No. 15/186,515.
Htay, Lin Lin M., Non-Final Office Action dated Sep. 14, 2018 for U.S. Appl. No. 15/186,516.
Htay, Lin Lin M., Notice of Allowance and Fee(s) Due and Notice of Allowability for U.S. Appl. No. 15/186,516, dated Jan. 25, 2019.
Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.
Khong, Alexander, Non-Final Office Action for U.S. Appl. No. 15/165,775, dated Jun. 14, 2018.
Klyne, G., Carroll, J., "Resource Description Framework (RDF): Concepts and Abstract Syntax," W3C Recommendation, Feb. 10, 2004, Retrieved from the Internet [retrieved Mar. 7, 2019].
Krishnan et al., U.S. Appl. No. 15/583,966, filed May 1, 2017 and titled "Automatic Generation of Structured Data from Semi-Structured Data."
Langedgger, Andreas, "XL Wrap—Spreadsheet-to-RDF Wrapper," 2009, Retrieved from the Internet [retrieved Mar. 7, 2019].
Lee, Mark B., Non-Final Office Action for U.S. Appl. No. 13/180,444 dated Jul. 2, 2012.

(56) References Cited

OTHER PUBLICATIONS

Lenz, H.J., Shoshani, A., "Summarizability in OLAP and Statistical Data Bases," Proceedings of the Ninth International Conference on Scientific and Statistical Database Management, 1997.

Manola, F., Miller, E., "RDF Primer," W3C Recommendation, Feb. 10, 2004, Retrieved from the Internet [retrieved Mar. 7, 2019].

Martin et al., U.S. Appl. No. 13/457,925, filed Apr. 27, 2012 and titled "Incremental Deployment of Computer Software Program Logic."

Martin et al., U.S. Appl. No. 61/479,621, filed Apr. 27, 2011 and titled "Incremental Deployment of Computer Software Program Logic."

May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).

McGuiness, D., Van Harmelen, F., "OWL Web Ontology Language Overview," W3C Recommendation, Feb. 10, 2004, Retrieved from the Internet [retrieved Mar. 7, 2019].

Miranker, Daniel Paul, "Accessing Relational Databases as Resource Description Framework Databases," U.S. Appl. No. 61/406,021, filed Oct. 22, 2010.

Miranker, Daniel Paul, "Automatic Synthesis and Presentation of OLAP Cubes from Semantically Enriched Data Sources," U.S. Appl. No. 61/362,781, filed Jul. 9, 2010.

National Center for Biotechnology Information, Website, Retrieved from the Internet [retrieved Mar. 7, 2019].

Nguyen, Kim T., Non-Final Office Action dated Jun. 14, 2018 for U.S. Appl. No. 15/186,514.

Nguyen, Kim T., Non-Final Office Action dated Mar. 20, 2019 for U.S. Appl. No. 15/454,923.

Nguyen, Kim T., Notice of Allowance and Fee(s) Due, dated May 15, 2019 for U.S. Appl. No. 15/454,923.

Niinimaki et al., "An ETL Process for OLAP Using RDF/OWL Ontologies," Journal on Data Semantics XIII, LNCS 5530, Springer, pp. 97-119, Aug. 12, 2009.

Pandit et al., "Using Ontology Design Patterns To Define SHACL Shapes," CEUR Workshop Proceedings, Proceedings of the 9th Workshop on Ontology Design and Patterns (WOP 2018), Monterey, USA, Oct. 9, 2018.

Parashar et al., U.S. Appl. No. 62/329,982, filed Apr. 29, 2016 and titled "Automatic Parsing of Semi-Structured Data and Identification of Missing Delimiters."

Patel-Schneider, P., Hayes, P., Horrocks, I., "OWL Web Ontology Language Semantics and Abstract Syntax," W3C Recommendation, Feb. 10, 2004, Retrieved from the Internet [retrieved Mar. 7, 2019].

Perez, J., Arenas, M., Gutierrez, C., "Semantics and Complexity of SPARQL," In Proceedings of the International Semantic Web Conference (ISWC2006). 2006.

Prud'hommeaux, E., Seaborne, A., "SPARQL Query Language for RDF," W3C Recommendation, Jan. 15, 2008, Retrieved from the Internet [retrieved Mar. 7, 2019].

Raab, Christopher J., Non-Final Office Action dated Jun. 28, 2018 for U.S. Appl. No. 15/186,520.

Raab, Christopher J., Notice of Allowance and Fee(s) Due and Notice of Allowability for U.S. Appl. No. 15/186,520, dated Jan. 2, 2019.

RDB2RDF Working Group Charter, Sep. 2009, Retrieved from the Internet [retrieved Mar. 7, 2019].

Sahoo, S., et al., "A Survey of Current Approaches for Mapping of Relational Databases to RDF," W3C RDB2RDF XG Report, Incubator Group, Published Jan. 8, 2009.

Sequeda, J., Depena, R., Miranker. D., "Ultrawrap: Using SQL Views for RDB2RDF," Poster in the 8th International Semantic Web Conference (ISWC2009), Washington DC, US, 2009.

Sequeda, J., et al., "Direct Mapping SQL Databases to the Semantic Web," Technical Report 09-04. The University of Texas at Austin, Department of Computer Sciences. 2009.

Sequeda, J., et al., "Ultrawrap: SPARQL Execution on Relational Data," Technical Report. The University of Texas at Austin, Department of Computer Sciences. 2012.

Sequeda, J., Tirmizi, S., Miranker, D., "SQL Databases are a Moving Target," Position Paper for W3C Workshop on RDF Access to Relational Databases, Cambridge, MA, USA, 2007.

Skevakis, Giannis et al., Metadata management, interoperability and Linked Data publishing support for Natural History Museums, Int J Digit Libr(2014), published online: Apr. 11, 2014; Springer-Verlag Berlin Heidelberg.

Smith, M., Welty, C., McGuiness, D., "OWL Web Ontology Language Guide," W3C Recommendation, Feb. 10, 2004, Retrieved from the Internet [retrieved Mar. 7, 2019].

Smith, T.F., Waterman, M.S., "Identification of Common Molecular Subsequences," J. Mol. Biol. 147, 195-197 (1981).

Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.

U.S. Appl. No. 16/251,408, filed Jan. 18, 2019.

Ultrawrap Mapper, U.S. Appl. No. 62/169,268, filed Jun. 1, 2015 (Expired).

Vy, Hung T., Final Office Action for U.S. Appl. No. 13/180,444 dated Dec. 3, 2014.

Vy, Hung T., Final Office Action for U.S. Appl. No. 13/180,444 dated Dec. 9, 2015.

Vy, Hung T., Final Office Action for U.S. Appl. No. 13/180,444 dated Feb. 22, 2013.

Vy, Hung T., Non-Final Office Action for U.S. Appl. No. 13/180,444 dated Jun. 18, 2015.

Vy, Hung T., Non-Final Office Action for U.S. Appl. No. 13/180,444 dated Mar. 26, 2014.

Vy, Hung T., Non-Final Office Action for U.S. Appl. No. 15/273,930 dated Dec. 20, 2017.

Young, Lee W., Notification of Transmittal of the International Search Report and the Written Opinion of the International Searching Authority, or the Declaration for International Application No. PCT/US2011/057334, dated Mar. 22, 2012.

Hu, Xiaoqin, Final Office Action dated Apr. 5, 2019 for U.S. Appl. No. 15/454,969.

Hu, Xiaoqin, Final Office Action dated Apr. 5, 2019 for U.S. Appl. No. 15/454,981.

Hu, Xiaoqin, Non-Final Office Action for U.S. Appl. No. 15/454,969 dated Dec. 7, 2018.

Hu, Xiaoqin, Non-Final Office Action for U.S. Appl. No. 15/454,981 dated Dec. 12, 2018.

J. Perez, M. Arenas, C. Gutierrez, "Semantics and Complexity of SPARQL," ACM Transactions on Database Systems (TODS), Vo. 34, No. 3, Article 16, Publication Date: Aug. 2009.

Joshi, Amit Krishna et al., "Alignment-based Querying of Linked Open Data," Lecture Notes in Computer Science, 7566, 807-824, 2012.

Yen, Syling, Final Office Action dated Apr. 10, 2019 for U.S. Appl. No. 15/186,519.

Yen, Syling, Non-Final Office Action dated Feb. 8, 2019 for U.S. Appl. No. 15/186,519.

Young, Lee W., International Searching Authority, Notification of Transmittal of the International Search Report and the Written Opinion of the International Searching Authority, or the Declaration for International Patent Application No. PCT/US2017/037846, dated Nov. 9, 2017.

Young, Lee W., International Searching Authority, Notification of Transmittal of the International Search Report and the Written Opinion of the International Searching Authority, or the Declaration for International Patent Application No. PCT/US2018/020812, dated Aug. 8, 2018.

Young, Lee W., Invitation to Pay Additional Fees And, Where Applicable, Protest Fee, dated Jun. 14, 2018 for International Application No. PCT/US2018/020812.

Young, Lee W., Notification of Transmittal of the International Search Report and the Written Opinion of the International Searching Authority, or the Declaration dated May 29, 2018 for International Patent Application No. PCT/US2018/018906.

(56) References Cited

OTHER PUBLICATIONS

Alaoui et al., "SQL to SPARQL Mapping for RDF querying based on a new Efficient Schema Conversion Technique," International Journal of Engineering Research & Technology (IJERT); ISSN: 2278-0181; vol. 4 Issue 10, Oct. 1, 2015, Retrieved from internet: https://www.ijert.org/research/sql-to-sparql-mapping-for-rdf-querying-based-on-a-new-efficient-schema-conversion-technique-IJERTV4IS1—1-5.pdf. Retrieved on Oct. 6, 2020.
Bullock, Joshua, Non-Final Office Action dated Dec. 7, 2021 for U.S. Appl. No. 16/457,750.
Bullock, Joshua, Notice of Allowance and Fee(s) Due dated Dec. 22, 2021 for U.S. Appl. No. 16/395,049.
Bullock, Joshua, Notice of Allowance and Fee(s) Due dated Feb. 23, 2022 for U.S. Appl. No. 16/457,750.
Doung, Hien, Non-Final Office Action dated Dec. 9, 2020 for U.S. Appl. No. 16/899,544.
Ellis, Matthew J., Non-Final Office Action dated Sep. 25, 2020 for U.S. Appl. No. 16/139,374.
European Patent Office, Extended European Search Report for European Patent Application No. 18757122.9 dated Oct. 15, 2020.
European Patent Office, Extended European Search Report for European Patent Application No. 18763855.6 dated Sep. 28, 2020.
Garay, Peter, Examination Report No. 1 for Standard Patent Application for Australia Patent Application No. 2017282656 dated Jul. 21, 2021, Intellectual Property Office of Australia.
Henry, Jerome William, U.S. Provisional U.S. Appl. No. 61/515,305, filed Aug. 4, 2011 entitled, "Apparatus and Method for Supplying Search Results With a Knowledge Card.".
Hoang, Hau Hai, Notice of Allowance and Fee(s) Due dated Aug. 19, 2021 for U.S. Appl. No. 16/697,132.
Hu, Xiaoqin, Non-Final Office Action dated Jul. 30, 2021 for U.S. Appl. No. 16/732,261.
Hu, Xiaoqin, Non-Final Office Action dated Sep. 2, 2021 for U.S. Appl. No. 16/732,263.
Kim, Harry C., Notification of Transmittal of the International Search Report and the Written Opinion of the International Searching Authority, or the Declaration, dated Sep. 28, 2021 for International Application No. PCT/US2021/036880.
Nguyen, Bao-Yen Thi, Restriction Requirement dated Jun. 29, 2021 for U.S. Appl. No. 29/648,466.
Nguyen, Kim T., Non-Final Office Action dated Aug. 31, 2021 for U.S. Appl. No. 16/899,549.
Nguyen, Kim T., Non-Final Office Action dated Dec. 10, 2020 for U.S. Appl. No. 16/137,297.
Nguyen, Kim T., Non-Final Office Action dated Dec. 8, 2020 for U.S. Appl. No. 15/985,704.
Nguyen, Kim T., Non-Final Office Action dated Jun. 7, 2021 for U.S. Appl. No. 16/457,766.
Nguyen, Kim T Non-Final Office Action dated May 11, 2021 for U.S. Appl. No. 16/395,036.
Nguyen, Kim T., Non-Final Office Action dated Nov. 24, 2020 for U.S. Appl. No. 16/036,834.
Nguyen, Kim T., Non-Final Office Action dated Nov. 24, 2020 for U.S. Appl. No. 16/036,836.
Nguyen, Kim T., Non-Final Office Action dated Nov. 27, 2020 for U.S. Appl. No. 15/985,705.
Nguyen, Kim T., Non-Final Office Action dated Oct. 14, 2020 for U.S. Appl. No. 15/943,629.
Nguyen, Kim T., Non-Final Office Action dated Oct. 14, 2020 for U.S. Appl. No. 15/943,633.
Nguyen, Kim T., Non-Final Office Action dated Oct. 27, 2020 for U.S. Appl. No. 15/985,702.
Nguyen, Kim T., Non-Final Office Action dated Oct. 5, 2020 for U.S. Appl. No. 15/927,004.
Nguyen, Kim T., Non-Final Office Action dated Oct. 5, 2020 for U.S. Appl. No. 15/927,006.
Nguyen, Kim T., Non-Final Office Action dated Sep. 21, 2020 for U.S. Appl. No. 15/926,999.
Nguyen, Kim T., Notice of Allowance and Fee(s) Due dated Aug. 17, 2021 for U.S. Appl. No. 16/428,915.
Nguyen, Kim T., Notice of Allowance and Fee(s) Due dated Aug. 3, 2021 for U.S. Appl. No. 16/457,766.
Nguyen, Kim T., Notice of Allowance and Fee(s) Due dated Mar. 16, 2021 for U.S. Appl. No. 15/985,702.
Nguyen, Kim T., Notice of Allowance and Fee(s) Due dated Mar. 16, 2021 for U.S. Appl. No. 16/137,297.
Nguyen, Kim T., Notice of Allowance and Fee(s) Due dated Mar. 17, 2021 for U.S. Appl. No. 15/985,704.
Nguyen, Kim T., Notice of Allowance and Fee(s) Due dated Mar. 31, 2021 for U.S. Appl. No. 15/985,705.
Noy et al., "Tracking Changes During Ontology Evolution." International Semantic Web Conference. Springer, Berlin, Heidelberg, 2004 (Year: 2004).
Raab, Christopher J., Non-Final Office Action dated Oct. 16, 2020 for U.S. Appl. No. 16/287,967.
Rachapalli et al., "Retro: A Framework for Semantics Preserving SQL-to-SPARQL Translation," The University of Texas at Dallas; Sep. 18, 2011, XP055737294, Retrieved from internet: http://iswc2011.semanticweb.org/fileadmin/iswc/Papers/Workshope/EvoDyn/evodyn_3.pdf. Retrieved on Oct. 6, 2020.
Slawski, Bill, Google Knowledge Cards Improve Search Engine Experiences, SEO by the Sea, Published Mar. 18, 2015, URL: https://www.seobythesea.com/2015/03/googles-knowledge-cards/, Retrieved Sep. 15, 2021.
Spieler, William, Advisory Action dated Nov. 22, 2021 for U.S. Appl. No. 16/435,196.
Spieler, William, Final Office Action dated Mar. 15, 2021 for U.S. Appl. No. 16/435,196.
Spieler, William, Non-Final Office Action dated Dec. 31, 2020 for U.S. Appl. No. 16/435,196.
Spieler, William, Non-Final Office Action dated Feb. 25, 2021 for U.S. Appl. No. 16/558,076.
Spieler, William, Non-Final Office Action dated Jul. 9, 2021 for U.S. Appl. No. 16/435,196.
Uddin, Md I, Non-Final Office Action dated May 13, 2021 for U.S. Appl. No. 16/404,113.
Uddin, Md I., Final Office Action dated Jan. 1, 2021 for U.S. Appl. No. 16/404,113.
Uddin, Md I., Non-Final Office Action dated Oct. 6, 2020 for U.S. Appl. No. 16/404,113.
Willis, Amanda Lynn, Non-Final Office Action dated Feb. 8, 2022 for U.S. Appl. No. 16/899,547.
Yotova, Polina, European Patent Office Examination Report, Communication Pursuant to Article 94(3) EPC for European Patent Application No. 17815970.3 dated Oct. 5, 2021.

* cited by examiner

PLATFORM MANAGEMENT OF INTEGRATED ACCESS OF PUBLIC AND PRIVATELY-ACCESSIBLE DATASETS UTILIZING FEDERATED QUERY GENERATION AND QUERY SCHEMA REWRITING OPTIMIZATION

CROSS-REFERENCE TO RELATED APPLICATIONS

This application is a continuation application ("CON") of U.S. patent application Ser. No. 15/439,911, filed Feb. 22, 2017; This application is a continuation application ("CON") of U.S. patent application Ser. No. 16/428,456, filed May 31, 2019; This application and U.S. patent application Ser. No. 15/439,911 are a continuation-in-part application of U.S. patent application Ser. No. 15/186,514, filed Jun. 19, 2016, now U.S. Pat. No. 10,102,258; This application and U.S. patent application Ser. No. 15/439,911 are also a continuation-in-part application of U.S. patent application Ser. No. 15/186,515, filed Jun. 19, 2016; This application and U.S. patent application Ser. No. 15/439,911 are also a continuation-in-part application of U.S. patent application Ser. No. 15/186,516, filed Jun. 19, 2016; This application and U.S. patent application Ser. No. 15/439,911 are also a continuation-in-part application of U.S. patent application Ser. No. 15/186,517, filed Jun. 19, 2016, now U.S. Pat. No. 10,324,925; This application and U.S. patent application Ser. No. 15/439,911 are also a continuation-in-part application of U.S. patent application Ser. No. 15/186,519, filed Jun. 19, 2016; This application and U.S. patent application Ser. No. 15/439,911 are also a continuation-in-part application of U.S. patent application Ser. No. 15/186,520, filed Jun. 19, 2016; This application and U.S. patent application Ser. No. 15/439,911 are also a continuation-in-part application of U.S. patent application Ser. No. 15/454,923, filed Mar. 9, 2017; This application and U.S. patent application Ser. No. 15/439,911 are also a continuation-in-part application of U.S. Nonprovisional patent application Ser. No. 15/454,955, filed Mar. 9, 2017; This application and U.S. patent application Ser. No. 15/439,911 are also a continuation-in-part application of U.S. patent application Ser. No. 15/454,969, filed Mar. 9, 2017; This application and U.S. patent application Ser. No. 15/439,911 are also a continuation-in-part application of U.S. patent application Ser. No. 15/454,981, filed Mar. 9, 2017; all of which are hereby incorporated by reference in their entirety for all purposes.

FIELD

The present invention relates generally to data science, machine and deep learning computer algorithms, data graph modeling, and analysis of linked data. More specifically, techniques for management of integrated access to public and privately-accessible datasets are described.

BACKGROUND

As demand for data and data science expands rapidly, significant research into potential uses of data in various applications are also increasing at a dramatic rate. With enormous amounts of data and information becoming increasingly available, utilizing data is becoming a greater focus of both consumer and commercial activities alike. Datasets (i.e., sets or groups of logically-related data and/or information) are being created to provide statistical information that researchers are using to discover new innovations and applications in almost every aspect of contemporary life and lifestyles. However, utilizing data also involves addressing a growing problem, which includes identifying data, sources thereof, and managing the ever-increasing amount of data becoming available. Moreover, as the amount and complexity of data, datasets, databases, datastores and data storage facilities increase, the ability to identify, locate, retrieve, analyze, and present data in useful ways is also becoming increasingly difficult. Today, managing large amounts of data for useful purposes poses a significant problem for individual users, organizations, and entities alike. Conventional techniques are problematic in that these are neither capable nor configured to manage large scale problems such as providing integrated access to data that is both available on public resources as well as those that are hosted or stored on private (i.e., secure (i.e., requiring authentication or authorization before access is permitted)) data storage resources. More importantly, users are typically burdened by conventional techniques in that access to data often requires not only proficient, if not expert, knowledge of both computer programming languages commonly known and used by data researchers and scientists (e.g., Python, or others), but knowledge of complex computer databases, datastores, data repositories, data warehouses, data and object schema, data modeling, graph modeling, graph data, linked data, and numerous other data science topics is also required. Queries executed to retrieve data using conventional techniques typically require knowledge of specific programming or formatting languages, which can limit the usability of data. Specifically, conventional techniques are problematic because these lack intrinsic knowledge or technical functionality to permit a user such as a data scientist to locate, manage, access, and execute queries to retrieve data from various disparate and often dissimilar data resources.

Thus, what is needed is a solution for managing consolidated, integrated access to public and/or privately-accessible (i.e., secure) data without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
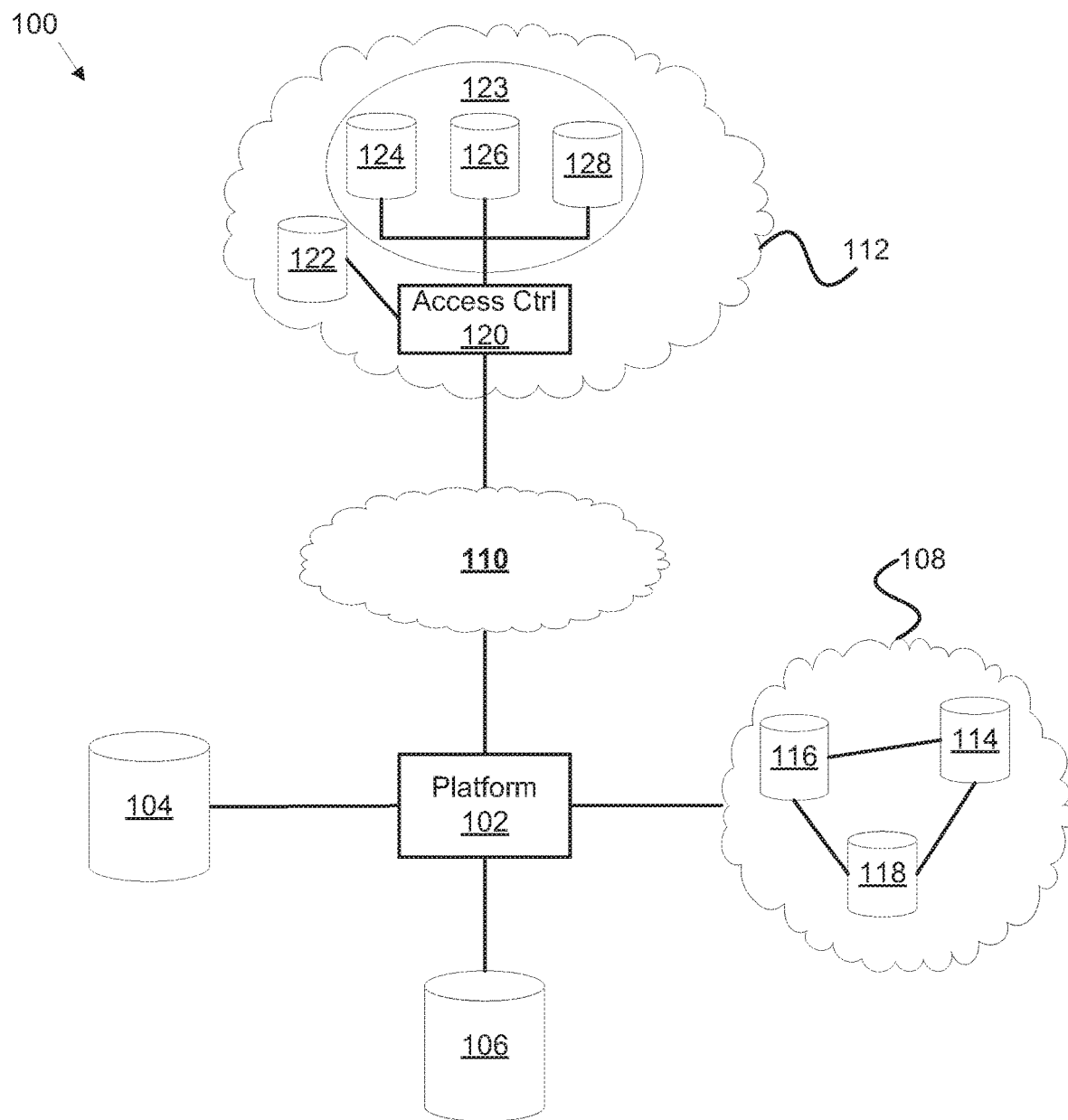
FIG. 1 illustrates an exemplary topology for platform management of integrated access to public and privately-accessible datasets utilizing federated query generation and schema rewriting optimization.

FIG. 1 illustrates an exemplary topology for platform management of integrated access to public and privately-accessible datasets utilizing federated query generation and schema rewriting optimization. Here, topology 100 includes dataset access platform ("platform") 102, databases 104-106, data networks 108-112 (as used herein, "data network" and "network" may be used interchangeably without limitation or restriction and are intended to be interpreted similarly with respect to this Detailed Description and/or the accompanying claims), databases 114-118, access control module 120, database 122, and datastore 123 (including databases 124-128). In some examples, "topology" may refer to a computer network topology that represents a map or aggregation of computing resources that are used to implement a feature, function, or set or group of functionality, including identified resources, technical specifications, protocols, languages, formats, and other elements. As used herein, "database" (e.g., databases 104-106, 114-118, 122, 124-128) may refer to any type of data storage facility, including, but not limited to, a standalone, web, networked, or computing cloud-based database, datastore, data repository, data warehouse, or any other type of facility or resource that may be used to store and/or retrieve data and information stored in accordance with a structured, unstructured, relational, or non-relational data schema or data object schema. As used herein, the terms "computing cloud" or "cloud" may be used interchangeably without limitation and may refer to any logical collection, grouping, assembly, or identified set of data computing based resources that provide various types of processing, storage, or other data operation and are not limited to any specific topology or geographic restriction and may be deployed over a distributed area or set of resources such as a collection of computers or servers located in disparate facilities distributed geographically, without limitation. In some examples, "datastore" (e.g., datastore 123) may refer to one or more databases (e.g., databases 104-106, 114-118, 122, 124-128) that are grouped or otherwise rendered interoperable using logical layers to provide management or overriding layers of management functionality for purposes of accessing, storing, and/or retrieving data and information stored within one or more databases within a given datastore. A datastore (e.g., datastore 123) does not need to topologically or logically reside on a single or individual network resource, as an example, and may be distributed in a widespread or disparate architecture using networked resources such as those found within a public or private (i.e., secured using authentication, authorization, token, password, or any other form of data security technique) data network, a computing cloud, or logical collection of networked data storage resources. For example, datastore 123 is shown including databases 124-128, but may, in other examples, also include one, some, or none of databases 104-106 and 114-118. Datastore 123 may also be implemented as a computing cloud and are not limited to any specific types of network architectures or topologies and the examples shown here are provided for purposes of exemplary illustration and description, without limitation. In other examples, other designs and implementations beyond those set forth and described herein may be used, without limitation or restriction to any specific design, architecture, implementation, embodiment, or example (i.e., collectively, "example").

As illustrated in exemplary topology 100, in some examples, dataset access platform 102 may be configured to access public and/or privately-accessible datasets that are hosted on one or more databases, some, all, or none of which may be hosted on data networks such as networks 108-112. As used herein, "dataset access platform," "access platform," and "platform" may be used interchangeably without limitation and, in some examples, refers to a computer program, software, firmware, circuitry, algorithms, logic, hardware, or a combination thereof in order to implement techniques (e.g., systems, processes, or the like) for providing integrated query, access, retrieval, and other data operations using public and private datasets. As shown in topology 100, platform 102 may be configured to access databases 104-106, 114-118, 122 and/or datastore 123 including databases 124-128 in order to execute a query to retrieve one or more datasets stored in these elements. Datasets may be retrieved by, for example, data scientists, researchers, or any other user who may be interested in querying and retrieving a dataset for a given purpose. Datasets may include any type, form, format, or amount of publicly-accessible sources of data such as those available from Data.Gov, the U.S. Department of Defense, oceanographic data from the National Oceanic and Atmospheric Administration (NOAA), as well as privately collected, curated, managed, and created datasets such as those found on corporate, non-profit, research, scientific, or academic data networks. Datasets may be retrieved from a large number of sources and, as used herein, are not intended to be limited to any specific type, source, or format of data. In some examples, network 108 may be a publicly-accessible data network that includes one or more databases such as databases 114-118.

In some examples, databases 104-106, 114-118, 122 and datastore 123 including databases 124-128 may be accessed or used by dataset access platform 102 using a "farm" or collection of graph database engines (see element 228 (FIG. 2) below) that are configured to execute queries received by (e.g., queries sent in SQL or other structured or unstructured programming or formatting languages to) platform 102 to retrieve datasets from one or more of 104-106, 114-118, 122 and datastore 123, which includes databases 124-128, each database of which may be configured for public (i.e., open) or private (i.e., secure, authentication required, access controlled, or the like) access, without limitation. In some examples, a dataset may reside on a private database (e.g., within a data network that requires authentication or access control conditions (e.g., tokens, certificates, passwords, hashes, or the like) in order to access the data network (e.g., network 112) and/or the dataset (i.e., which may be stored on database 122 or datastore 123 including databases 124-128). Private datasets (e.g., database 122) may reside on a secure network in order to prevent access to data that may be sensitive, confidential, private, personal, or otherwise not desired or intended for public viewing.

As shown, platform 102 may be configured to access datasets stored on publicly-accessible (i.e., public or open) databases 104-106 and 114-118 or, in some examples, private database 122 and/or datastore 123 and databases 124-128. Platform 102, in some examples, may be a platform or application such as that developed by Data.World of Austin, Tex., including various features and functionality, as described in some of those properties incorporated by reference as set forth above. As shown, datastore 123 includes databases 124-128, although the number, type, format, data schema, and other characteristics may be varied and are not limited to the examples shown and described. For example, datastore 123 may use a database management system (not shown) to manage databases 124-128. As shown here, platform 102 may be configured to communicate over one or more other data networks such as the Internet, a private data network, or a computing cloud, without limitation to the type of data network provided a layered topology is used to communicate queries to/from platform 102 and a destination or target database (e.g., databases 104-106, 114-118, 122 and datastore 123 including databases 124-128). Platform 102 may also be configured to access datastore 123, which could be housed and operated on a separate data network (e.g., data network 112) than another data network through which a query or request is transmitted, passed, or sent (e.g., data network 110). In other words, platform 102 may be a standalone, distributed, local, remote, or cloud-based application, process, algorithm(s), computer program, software, firmware, hardware, server, or the like (hereafter "application") that may be a standalone or distributed application, the latter of which may have one or more resources housed, stored in memory, executed from, or reside on disparate physical resources (e.g., servers, computers, or the like) in different geographic locations. However, when a query or request to query (the terms "query," "request," or "request to query" may be used interchangeably herein) is received by platform 102 for one or more of databases 104-106, 114-118, 122 and datastore 123 including databases 124-128, platform 102 may be configured to receive, parse, interpret, convert, rewrite, optimize, and execute the query in order to retrieve a dataset from one of the aforementioned data sources (i.e., databases 104-106, 114-118, 122 and datastore 123 including databases 124-128).

In some examples, a query (e.g., sent in SQL, SPARQL, R, Python, Java, Javascript, JSON, XML, or any other programming or formatting language that is used to generate and send queries for retrieving datasets) may be received by platform 102 and sent to access control module 120 (as with platform 102, access control module 120 may be a standalone, distributed, local, remote, or cloud-based application, process, algorithm(s), computer program, software, firmware, hardware, server, or the like (hereafter "application")), which provides access control functionality and prevents unauthorized access to datasets stored on one or more of databases 122 and 124-128 and datastore 123. In other words, access control module 120 receives queries on behalf of, for example, a private data network (e.g., network 112), which could be a scientific, academic, research, governmental, military, financial, corporate, non-profit, or any other type of data network in which non-public access is desired or security measures including, but not limited to access control module 120, are intended to limit, deter, or prevent access. If the query received by platform 102 and sent to network 112, which is an exemplary private data network, is rejected due to a lack of authorization or permission to access the dataset and/or data network (i.e., an access control condition is not met), platform 102 can notify a user (not shown) on a display or user interface that indicates a status of the query (also not shown). For example, a query written in SQL may be received by platform 102, which may be a standalone (e.g., hosted, remote, or local) or distributed (e.g., server, network, or cloud-based) software platform composed of multiple programs or scripts (e.g., Java®, JavaScript®, and/or other programming or formatting languages, structured or unstructured, or the like) that is configured to parse and analyze the query to determine through inference (as described in greater detail below) attributes, one of which may include an access control condition that permits the query to be run (i.e., executed) against an access-controlled (e.g., password, encryption, authentication, token-based, or any other form of electronic or digital security measure intended to limit or prevent access to a given dataset) database, datastore, dataset, network, or the like. Once authenticated (i.e., an access control condition matches or is approved by access control module 120), a query (not shown) from platform 102 may be permitted access in order to retrieve a dataset from database 122 or datastore 123 (and, subsequently, databases 124-128). Due to conventional solutions being problematic in handling and executing queries in one format against databases that may be in another format, platform 102 is configured to receive, parse, and run inference operations (as described in greater detail below) in order to determine and identify any attributes that may be related to the query, the dataset(s), or the database or datastore in which the dataset(s) are stored. More specifically, platform 102 includes, among other modules and functionality, an inference engine (not shown) that is configured to infer one or more attributes of a query, the target dataset (i.e., the dataset requested once the query has been executed), and the source database or datastore on which the dataset(s) are stored. Further, platform 102 may also be configured to convert a query from one format (e.g., SQL or another structured or unstructured query language) into a different "atomic" format (e.g., RDF™ (as developed by W3C®, or another triple-oriented language (i.e., languages and protocols such as SPARQL (as also developed by W3C®) that may be used to convert data associated with queries into subject-predicate-object-oriented data structures otherwise known as "triples") that can be used to generate, by platform 102, rewritten queries that incorporate other triple data directed to attributes such as type, format, access control conditions, or in an integrated manner against various types and formats of databases, datastores, data repositories, data warehouses, and the like.

As an example, platform 102 may be configured to rewrite a query (e.g., programmed or formatted in SQL, Python, R, or other statistical or data analytical software) from one format, structure, or schema to another in order to execute a query against multiple disparate types of data storage facilities (e.g., databases, datastores, data repositories, data warehouses, and the like), which may each be of a different schema, structure, and/or type, without restriction. Further, in some examples, platform 102 may be configured to rewrite a query from one format, structure, or schema into another, but also "optimize" a rewritten query (as described in further detail below), by converting data associated with one or more inferred attributes that were determined during the parsing of the query upon its receipt by platform 102. "Optimizing" a query before, during, or after it has been rewritten by platform 102, may, in some examples, refer to optimizing a copy of a query or a master of a query. Optimizing a query may occur during or after a rewriting operation has been performed by platform 102, which could include, but is not limited to, rewriting a query (i.e., master or a copy) from one query language to another format that can then be used to generate further downstream queries for different target or disparate databases that may include datasets that are either sought, in accordance with the original query, or logic incorporated into platform 102 may execute to infer there may be other datasets that are indexed or linked (i.e., as linked data) by platform 102 that, although not known or targeted by the original query, could be returned with the intended target dataset. In some examples, queries may be optimized after being written from SQL to triples using RDF™, SPARQL™, or the like because the rewritten triple data, which may be stored in a datastore accessed by platform 102, but intended to store converted triple data from incoming queries (i.e., a "triple store") may be retrieved with other triple data that has been generated resultantly from inferred attributes. In other words, inferred attributes such as type, data types (i.e., specific types of data that are typically identified by columnar or row headings in a tabular format, but could also be found in a multi-dimensional grid storage structure such as name, date, value, postal code, country, state, or any other type that can be used to identify a logical grouping of data, without limitation or restriction), data structure, data schema, object schema, addresses (e.g., Uniform Resource Locator (URL), Uniform Resource Identifier (URI), web address, and the like), layout, design, style, format, language, structure, and others without limitation to any particular attribute or type or category thereof. The triple data rewritten from the query and the triple data associated with attributes related to the query (hereafter, "query" may refer to a copy of a query or a master (i.e., original or originally received by platform 102) query, without limitation or restriction) may be specifically rewritten for a database housing or storing the intended target dataset database. In some examples, an original query or a copy of an original query may be subject to various data operations by platform 102, without restriction or limitation. If a copy of an original query is used by platform 102, the original query may itself be identified as a "master" and saved to one or more of databases 104-106 or another database, datastore, data warehouse, data repository, or other data facility or structure used by platform 102 to store internal data. Thus, a master query or master (hereafter "master") may be preserved in the event query data used by platform 102 becomes corrupted or unusable.

In some examples, other databases that are "known" through previous queries or discovery by platform 102 that may store or house datasets similar, related, or associated with the intended dataset may be identified as a linked dataset or linked data and included in part of a data model or graph that can be used to retrieve data or datasets in response to various queries. In other words, platform 102 may use a graph (i.e., data model) that, once a query is received, logic (e.g., a logic module that may employ rules, machine learning, artificial intelligence, deep learning, natural language processing, or other algorithms, software, computer programs, applications, or the like to implement decision-based processing of data) then determines other linked data may be related to the dataset sought by the query and delivered to the user in response. Further, the linked datasets may also be included in a modified or new graph that may be created to include the intended target dataset as a new node within the graph. Various types of graph generation techniques may be used, without limitation or restrictions, such as mapping different data types (e.g., using specification such as comma separated values ("csv") to RDF, CSVW, among others) and storing these maps as graphs within a database or datastore (e.g., databases 104-106 and 114-118). Other graph generation techniques may be used and are not limited to any particular algorithm, process, or methodology.

In some examples, although a SQL-based query may have a SELECT statement (i.e., a programmatic query command or query statement intended to fetch an intended dataset or data stored within a given database), platform 102 may be configured to convert a statement (e.g., a query statement such as SELECT in SQL, and other comparable commands in any other type of query language, structured or unstructured) into SPARQL, for example, by parsing the query statement into a data structure such as an abstract syntax tree in an intended (i.e., target) language such as SPARQL. Once generated, an abstract syntax tree mapping a received query statement may be used to determine how to map the statement from its native language into a comparable statement in, for example, SPARQL (or another language that may be configured to perform the processes described herein). Using an abstract syntax tree (not shown) may be used to further generate a resultant SPARQL query statement, command, data structure, or object that may be configured to execute over (e.g., using) a triple store or triple data within a datastore, such as those described herein. Using attributes inferred from or stated in a originally-received (i.e., native) statement (e.g., SQL query statement, as described above as an example), triple data can be amassed in a triple store (i.e., a datastore, database, repository, or other type of data structure configured to store triple data reduced, atomically, as described herein) and used during the generation of a substantially equivalent statement (e.g., a query) into SPARQL. As an example, attributes may identify an access control condition (e.g., password, token, or other security feature that must be navigated successfully before access to a dataset or a database, data repository, datastore, or other type of data structure is permitted) that manages (e.g., controls) access to a target or intended dataset. For example, a password, token, hash value, or any other type of security-oriented attribute may be converted into one or more triples and, in some examples, an endpoint server (not shown) associated, in data communication, or configured to perform data operations with platform 102 may be used to rewrite the triple data of the query and the attribute into another form, format, language, structure, or schema for a target database that the endpoint server is configured to communicate with over one or more data networks. In some examples, platform 102 may be configured to receive a query, rewrite the data associated with the query and any attributes (e.g., attributes of the query, the target dataset(s), the target database(s), paths, linked data, or any other attribute including, but not limited to those examples provided above) into a language, structure, schema, or format associated with another database by converting query data (i.e., data associated with a query) and data associated with attributes of the queries into triples, execute the rewritten queries, and, in some examples, return not only the requested dataset(s), but also dataset(s) that may be related to the dataset(s). In other examples, platform 102 may be configured to return only the target dataset(s) requested by the query and no others. In still other examples, platform 102 may be configured to return some dataset(s) that may be associated with or related to the target dataset(s) requested by the query, which may be determined based on rules or logic of platform 102. Further, platform 102 may also be configured to create or modify a graph (e.g., data model) that is used when a query for a given dataset is received, which may be further used to return additional data that could be valuable due to an attribute-determined relationship or association between the target dataset, the query, and other dataset(s) known or graphed or identified as linked data by platform 102. The above-described topology, elements, and processes may be varied in size, shape, configuration, function, and implementation and are not limited to the examples shown and described.

Figure 2:
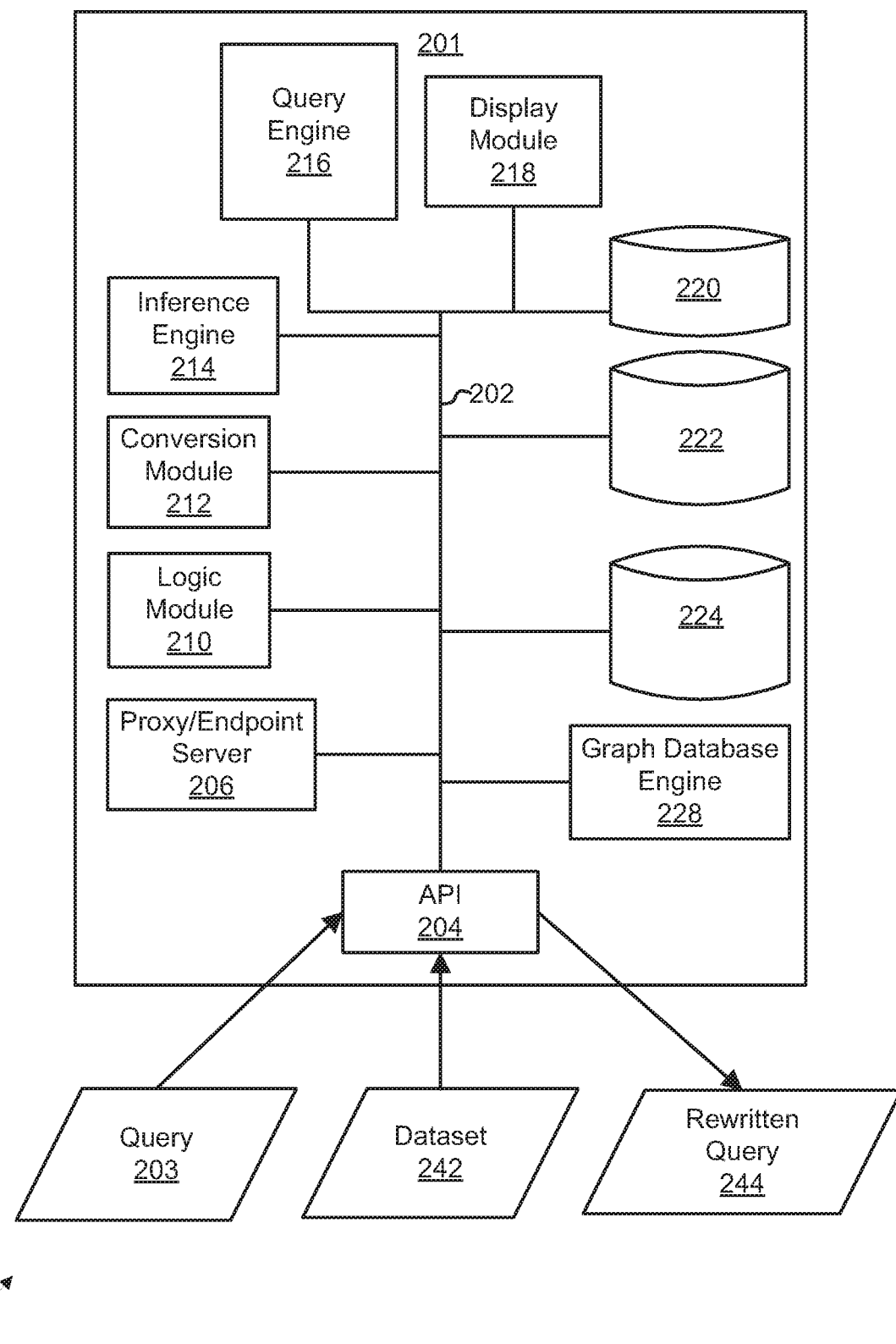
FIG. 2 illustrates an exemplary platform architecture for a platform for managing integrated access to public and privately-accessible datasets utilizing federated query generation and schema rewriting optimization.

FIG. 2 illustrates an exemplary system architecture for a platform for managing integrated access to public and privately-accessible datasets utilizing federated query generation and schema rewriting optimization. Here, system 200 is shown, including application 201 (in some examples, application 201 may be comparable in function and structure to platform 102 as described above in connection with FIG. 1), data communication bus 202, application programming interface or API (hereafter "API") 204, proxy/endpoint server 206 (which may also be referred to interchangeably as a "proxy," "endpoint," "proxy server," "endpoint server"), logic module 210, conversion module 212, inference engine 214, query engine 216, display module 218, databases 20-224, and graph database engine 228. Data elements transferred (i.e., received and sent) from application 201 may take various forms including, but not limited to query 203, dataset 242 (which may be interchangeably referred to herein as a "target dataset(s)"), and rewritten query 244. In some examples, system 102 may be an exemplary implementation of platform 102 (FIG. 1). The elements shown and the configuration, structure, relative size of the elements, and functions described are not intended to be limiting and the sizes and shapes of the elements have no limitation or meaning apart from those provided within the detailed description of this specification or as claimed.

As shown, application 201 may be a implemented as a process, computer program, software, firmware, hardware, circuitry, logic, or a combination thereof (hereafter "application") and, in some examples, may be written in Java® and/or JavaScript®, among others. Each of elements 201-228 may be programmed, developed, or encoded using software programming techniques familiar to these programming and formatting languages or others, without restriction, regardless of whether object-oriented, structured, or unstructured. In some examples, application 201 is configured with elements 202-228 in order to receive query 203 that is directed to retrieve (e.g., fetch, download, access and copy, or otherwise obtain using one or more data operations) a target dataset (e.g., dataset 242) in response to rewritten query 244. As described herein, application 201 may be written in any programming or formatting language (e.g., SQL, Python, R, or others) used to query a database. Application 201 may be configured to receive query 203 using API 204 and analyzing, using logic module 210, query 203 to determine one or more attributes associated with query 203, dataset 242, or a database (e.g., databases 104-106, databases 114-118, database 122, and datastore 123 (including databases 124-128) as shown and described above in connection with FIG. 1). Query 203 may be stored in a database configured to store query data (i.e., query data 224). Once stored, query 203 may be identified, in some examples, as a "master" of query 203. A copy of query 203 may be made and also stored in one or more of databases 220-224 and used as a replica. In other words, a replica or copy (hereafter, "replica" and "copy" may be used interchangeably without restriction or limitation) may be used to perform various data operations such as those described herein rather than a master of query 203, the latter of which may be preserved (i.e., stored) for later use to restore from an event that results in partial or full loss of the data in query 203, whether due to corruption, catastrophe, or some other event that can cause a similar detrimental or destructive effect. In other examples, an original version of a query (i.e., the originally-received version of query 203) may be used by application 201.

Here, in some examples, a replica of query 203 (not shown) or query 203 is parsed by logic module 210, which is configured to analyze data received by application 201 (e.g., query 203) or dataset 242 and to generate instructions to other elements within application 201 to perform various data operations such as those described herein. Structurally, logic module 210 may be a set of logical rules or algorithms for machine learning, deep learning, artificial intelligence, or the like. Logic module 210 may be programmatically coded in one or more languages such as Java®, JavaScript®, R, or others, without limitation or restriction. Functionally, logic module 210 may be configured to perform various data operations such as generating data or signals to provide instructions to inference engine 214, query engine 216, or any other element of application 201. Logic module 210 may also be configured to generate and send instructions (i.e., as data or signals) to graph database engine 228 in order to generate one or more data models associated with query 203. Further, during parsing, inference engine 214 may be configured to determine attributes associated with query 203 through inference (e.g., Bayesian, statistical, probabilistic, predictive, or other techniques may be employed for inference and are not limited to any specific types of techniques for inferring attribute data associated with query 203). In some examples, attributes may include, but are not limited to, any type of information or characteristic associated with or about a query, dataset 242, which is intended to be fetched by query 203 (i.e., using, for example, a SQL SELECT command to retrieve dataset 242 for a given database (not shown)), and the destination or target database from which dataset 242 is to be retrieved. While examples are provided for the disclosed techniques to operate on a singular dataset, these may also be extended to operate on multiple datasets and databases, without limitation or restriction. Attributes may include, but are not limited to, property attributes (e.g., string literal, numerical, or the like), values, qualities, characteristics, or any other data, metadata, and information about or related to an item contained within a dataset or a database and which can be inferred by inference engine 214. Attributes, once inferred by inference engine 214 as a result of parsing being directed by logic module 210, along with query 203 can be converted into "atomic" data or triples in accordance with languages, protocols, and formats such as the Resource Description Framework (hereafter "RDF") as promulgated by the World Wide Web Consortium (hereafter "W3C"), SPARQL, and others used for organizing, formatting, programming, converting, structuring, or otherwise manipulating data for use on "semantic web" applications and the like, including semantic uses for retrieving dataset 242 from databases or the like or from other data networks that do not employ common data languages, formats, and protocols. By converting, for example, SQL-based data (or data for query 203 formatted using a structured or unstructured language) can be converted into RDF triple data that can be used as a common base language, format, or protocol that can later be used by query engine 216 and proxy/endpoint server 206 to "rewrite" or construct rewritten query 244, which is ultimately transmitted from application 201 to a database for retrieving dataset 242. In some examples, dataset 242 may be retrieved or fetched from a database using rewritten query 244 and may include not only dataset 242, but also other datasets that might be related to or are similar to the dataset sought.

In some examples, the determination of whether dataset 242 may be related to other dataset(s) that were previously retrieved or otherwise indexed by application 201 and its elements (namely, graph database engine 228, which may be configured to create a graph or data model representative of dataset 242 that were previously fetched (i.e., retrieved) and/or stored in one or more of databases 220-224) may be made by logic module 210, query engine 216, and graph database engine 228. When query 203 is received, for example, logic module 210 analyzes inferred attribute data from inference engine 214 and can generate/send instructions to query engine 216 to reference graph database engine 228 in order to determine whether any of the triple data converted from query 203 and stored in one or more of databases 220-224 matches previously converted triple data stored similarly. Alternatively, a graph created of query 203 (or a copy thereof) or dataset 242 may also be stored in one or more of databases 220-224 and used as a reference for a comparison to another graph previously stored in databases 220-224 to determine if there is a match (i.e., where there are other datasets that may be related (and presumably of interest to a data scientist (i.e., user)) or similarity with dataset 242. In other examples, a rule or set of rules that establish a percentage or numerical threshold may be input using logic module 210 (e.g., display module 218 may be configured to generate, by executing one or more scripts, forms, or formats such as HTML, XML, PHP, or the like) to provide a user interface that a data scientist or researcher (i.e., a user of platform 200) may use to input a rule, criteria, or restriction for use in determining whether there are any dataset(s) that may be similar to dataset 242. In still other examples, users may enter other rules, criteria, or restrictions that permit or do not permit application 201 to return similar or matching datasets for presentation on a user interface (not shown) provided by display module 218, which, working in concert with API, may receive and send (for display or visual rendering) data in various types of formats including, but not limited to HTML, XML, XHTML, or any other type of programming or formatting language that may be used to generate the user interface.

Referring back to inference engine 214, any attributes inferred may be analyzed by logic module 210 and then converted into, for example, triple data (e.g., triple formats such as those described herein and in accordance with protocols such as SPARQL, RDF, among others, without limitation and/or restriction) that can be stored along with the triple data associated with query 203 itself; stored, that is, in one or more of databases 220-224. Inference engine 214 may also be configured to infer attributes about a given dataset(s) such as layout (e.g., columns, rows, axes, matrices, cells, text, among others), data type (e.g., string literals, numbers, integers, fractions, decimals, whole numbers, and the like), but also exceptions (i.e., data that is inconsistent with inferred attributes or other data within a given dataset(s)). In some examples, when exceptions are found, display module 218 may be configured to visually present, render, or otherwise display, in various types of graphical user interface layouts (not shown), without limitation or restriction. In some examples, user interfaces may be presented that provide, in addition to data from a retrieved dataset(s), but also exceptions, annotations, outlier data, inferred attributes, attribute data, or others, using techniques that data scientists and researchers would be familiar with using (e.g., Python, R, and the like) without requiring in-depth or expert knowledge of programming languages underlying platform 102 (e.g., SPARQL, RDF, Java®, JavaScript®, among others). In some examples, one or more of databases 220-224 may be configured to store only triple data, while another database may be configured to store query 203 as a master (as previously described) or copies thereof in order to restore from a catastrophic loss or data corruption event. As an example, query 203 may be rejected by a target database (e.g., databases 104-106, databases 114-118, database 122, and datastore 123 (including databases 124-128) as shown and described above in connection with FIG. 1) or access control module 120 (FIG. 1)) because of a partial or complete corruption of data. A master or copy of query 203 may be retrieved by application 201 from one or more of databases 220-224 and used to generate another rewritten query (e.g., rewritten query 244) using triple data associated with query 203 and triple data associated with any attributes inferred by inference engine 214, both of which may be stored in one or more of databases 220-224. Likewise, dataset 242 or a copy thereof may also be stored in one or more of databases 220-224. In some examples, attribute(s) determined from inference operations run against query 203 may also include an access control condition or data related thereto, such as a password, token, authentication key, private or public key, hash value, or any other type of data security mechanism.

In some examples, an access control condition, in some examples, as a type of attribute can also be converted by conversion module 212 into triple data that may be stored in one or more of databases 220-224, one or all of which may be either local, remote (not shown), or distributed (local or remote) data storage facilities. In some examples, databases 220-224 may be standalone, server, network, or cloud-based data storage facilities and are not limited to the examples or configurations shown and described in connection with FIG. 2.

Referring back to conversion module 212, data associated with query 203 (or a copy thereof) may be converted into triple data and stored in one or more of databases 220-224, which may be later used to generate rewritten query 244 by, in some examples, proxy/endpoint server 206. In some examples, proxy/endpoint server 206 may be implemented using multiple instantiations for different types, structures, formats, and data schema of databases, datastores, data warehouses, data repositories, or any other types of data storage facility(s). As shown, after query 203 has been converted into triple data that may be stored in one or more of databases 220-224 (and as further described above) and any inferred attributes determined by inference engine 214 have also been converted into triple data (which may likewise be stored in one or more of databases 220-224), proxy/endpoint server 206 and query engine 216 are configured to generate rewritten query 244 for each target database (not shown) on which dataset 242 is stored (e.g., as originally programmed using, for example, a SELECT statement in SQL) as well as any other dataset(s) that have been identified by logic module 210 as a result of analyzing graphs and/or data models generated by graph database engine 228 and/or those previously generated by graph database engine 228 and stored on one or more of databases 220-224 (i.e., identifying other datasets that may be similar to or match dataset 242, or identifying isomorphic (i.e., data that is related to other data) amongst queried, retrieved, or linked dataset(s)). Further, logic module 210 may also limit, expand, or otherwise modify the number and type of dataset(s) retrieved in response to a fetch command or statement, depending upon rules or instructions provided by a user as received by API 204 and display module 218. In still further examples, proxy/endpoint server 206 may include multiple instantiations, each of which is configured to generate multiple rewritten queries for different types, formats, structures, and/or data schemas for various databases (i.e., multiple versions of rewritten query 244, where each version may be generated for different types of databases (e.g., Relational, Document-oriented, Key-value, Graph, or others), without limitation or restriction to any particular type, format, or data schema of database. The described techniques enable data scientists (e.g., users) to generate a request using a query language that can be parsed, analyzed, converted, and rewritten in order to support different types, formats, structures, and data schemas without having to manually rewrite each query for a specific type of database. Further, rewritten query 244 may be "optimized" such that data or metadata representing attributes inferred by inference engine 214 can also be included as triple data during the rewriting process (as described in further detail below) in order to include data or information that can not only fetch or retrieve dataset 242, but also dataset(s) that may be useful, valuable, or otherwise related to the one sought by query 203. Optimization may also include rewriting query 203 from one query language into triples, as discussed herein, and from the triples data into rewritten query 244 by proxy/endpoint server 206, which may also include, during the rewriting process (as described in greater detail below) an access control condition (e.g., password, token, authentication data, encryption data, hash value, or other security data or information) from the converted triple data stored in databases 220-224 in order for rewritten query 24 to gain access to and retrieve from, for example, dataset 242 from a private (i.e., secure) network (e.g., network 112, which may include access control module 120, datastore 123, and databases 122-128). In other examples, the above-described elements may be varied in size, shape, configuration, function, and implementation and are not limited to the descriptions provided.

Figure 3:
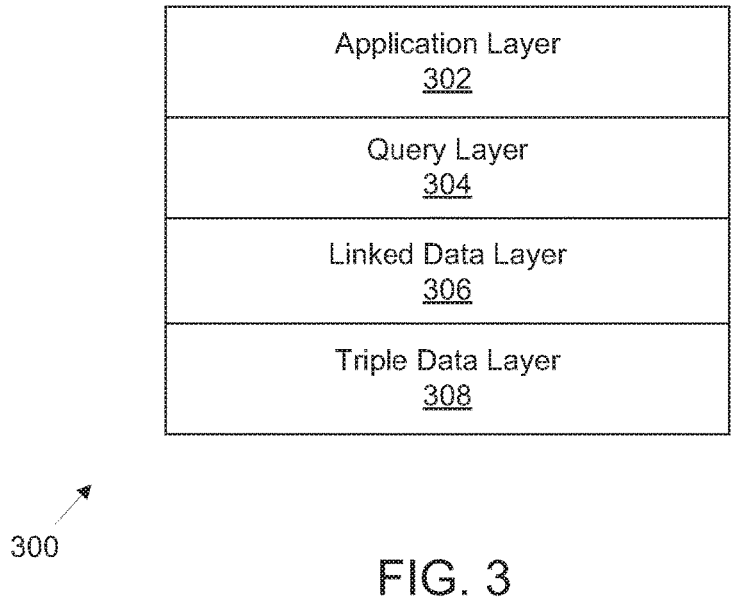
FIG. 3 illustrates an exemplary layered architecture for platform management of integrated access to public and privately-accessible datasets utilizing federated query generation and schema rewriting optimization.

FIG. 3 illustrates an exemplary layered architecture for platform management of integrated access to public and privately-accessible datasets utilizing federated query generation and schema rewriting optimization. Here, application stack 300 (hereafter "stack 300") illustrates an exemplary layered architecture that may be used to implement application 201 (FIG. 2), including application layer 302, query layer 304, linked data layer 306, and data layer 308. Stack 300 is neither a comprehensive nor fully inclusive layered architecture for developing an application or platform for managing integrated access to public and privately-accessible datasets utilizing federated query generation and schema rewriting optimization.

As shown, stack 300 includes application layer 302, which may be the architectural layer at which application 201 (FIG. 2) or platform 102 (FIG. 1) is coded using, for example, Java®, JavaScript®, Ruby, C+, C++, C #, C, or any other structured or unstructured programming language. In some examples, data for coded functionality that is used to enable one or more of the elements shown and described in connection with FIG. 2 may be transferred (i.e., sent, received), modified, executed, or otherwise operated on at this layer in the architecture of stack 300. In other examples, application layer 302 may be implemented differently in the architecture of application 201.

Query layer 304 is an exemplary layer of the architecture of application stack 300, which may be an architectural layer at which query data is retrieved, analyzed, parsed, or otherwise used to transfer data for various computing operations associated with receiving query 203 (FIG. 2) and generating rewritten query 244 (FIG. 2) in order to retrieve dataset 242 (FIG. 2). Query layer 304 may also be the layer in stack 300 at which API 204, proxy/endpoint server 206, conversion module 212, inference engine 214, query engine 216, display module 218, databases 220-224, and graph database engine 228 receive data and signals generated from logic module 210 for performing various data operations (e.g., parsing, analyzing, converting, rewriting, and optimizing query 203 and rewritten query 244, among others) on query 203, dataset 242, or rewritten query 244 prior to converting data associated with these data elements to triples (as described herein). In other examples, query layer 304 may be designed, configured, and implemented differently and is not intended to be limited nor restricted to the examples shown and described.

Here, linked data layer 306 may be an architectural data layer at which query 203 (FIG. 2) can be analyzed and parsed by logic module 210 (FIG. 2), from which graphs may be generated. Once graphs are generated, in some examples, linked data layer 306 is the architectural layer at which graph data (not shown) may be transferred (i.e., sent, received) or otherwise communicated between the various elements of application 201 (FIG. 2). Further, graph data (i.e., data and metadata associated with graphs of linked data that are generated, stored, modified, or otherwise used by application 201 when rewriting and optimizing query 203 into rewritten query 244 (as described in greater detail below).

Here, triple data layer 308 is illustrative of an exemplary layer in the architecture of application 201 (FIG. 2) at which "atomic" triple data has been converted from the native programmatic and/or formatting language of query 203 or another query received by application 201. As discussed above, conversion module 212, in some examples, converts data associated with query 203 into RDF or other forms of "atomic" triples data, which can be stored by platform 201 (e.g., in databases 220-224). As used herein, "atomic" may refer to a common conversion data format that, once converted, can be used to create various types of queries for datasets stored on different, inconsistent, or incongruous databases. Some examples of types of triple formats and protocols that may be used to convert query 203 include, but are not limited to RDF, SPARQL, R, Spark, among others. Once converted, triple data layer 308 is the layer at which triple data can be exchanged among the various elements of application 201 (FIG. 2) from which rewritten query 244 can be created by proxy/endpoint server 206 (FIG. 2) and query engine 216 (FIG. 2) to create federated queries (i.e., rewriting query 203 for multiple inconsistent and non-congruous databases (as described herein) using disparate data communication and transfer protocols, query languages, data schema, data models, and the like. As used herein, "federated" may refer to the described techniques being used to generate, transmit, execute, and manage rewritten queries (i.e., multiple instances of rewritten query 244) for different databases in order to retrieve not only the originally-requested dataset of query 203, but other dataset(s) that may be related to, associated with, or included for retrieval, regardless of the data type, format, structure, data schema, data model, graph, or other characteristics of the database on which the datasets (e.g., dataset 242) are stored. Further, any attributes determined by inference engine 214 are also converted by conversion module 212 (FIG. 2) and stored in one or more of databases 220-224, but may also be exchanged, transferred, modified, or otherwise operated upon at triple data layer 308 of stack 300 as shown in FIG. 3. In other examples, stack 300 and the various layers shown may be varied in structure, function, format, data type, data model, or other aspects and are not limited to the examples shown and described.

Figure 4:
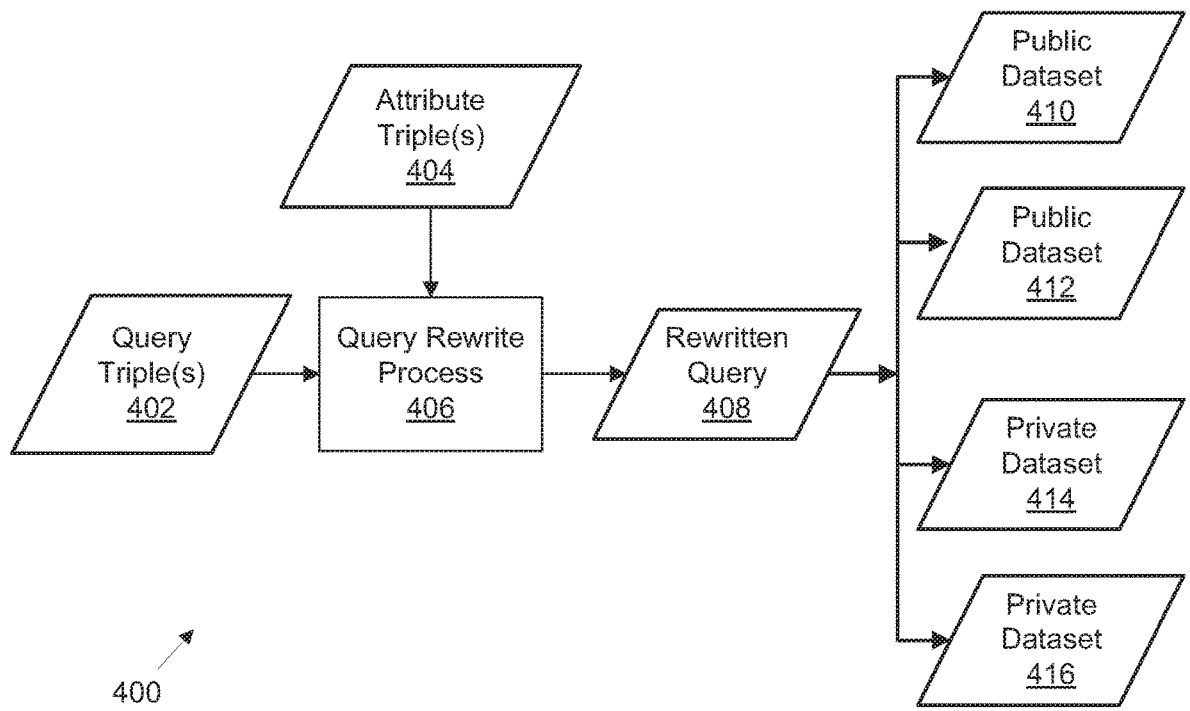
FIG. 4 illustrates an exemplary data flow for platform management of integrated access to public and privately-accessible datasets utilizing federated query generation and schema rewriting optimization.

FIG. 4 illustrates an exemplary data flow for platform management of integrated access to public and privately-accessible datasets utilizing federated query generation and schema rewriting optimization. Here, data flow 400 includes query triple data 402, attribute triple data 404, query rewrite process 406, rewritten query 408, public datasets 410-412, and private datasets 414-416. In some examples, query triple data 402 and attribute triple data 404 are received as data inputs to query rewrite process 406. Using converted triples (as described above) in, for example, RDF, query rewrite process 406 then generates rewritten query 408, which is then directed by proxy/endpoint servers (e.g., proxy/endpoint server 206 (FIG. 2)) to one or more public and/or private databases that may be housed, stored, operated, distributed by, or otherwise logically accessible on one or more public and/or private data networks (not shown). In some examples, rewritten query 408 may be similar to rewritten query 244 (FIG. 2) and, is converted by conversion module 212 (FIG. 2) from triple-formatted data (e.g., query triple(s) 402 and attribute triple(s) 404) into the query language or format of a target dataset (e.g., dataset 242 (FIG. 2), public datasets 410-412, private datasets 414-416, among others). Once rewritten query 408 is generated, it may be directed, transmitted, transferred, or otherwise executed as a query against one or more databases (not shown) storing public datasets 410-412 and private datasets 414-416. The number, type, shape, and flow of data flow diagram 400 may be varied in process, steps, order, function, description, or other aspects, without limitation or restriction, and are not limited to the examples shown and described.

Figure 5:
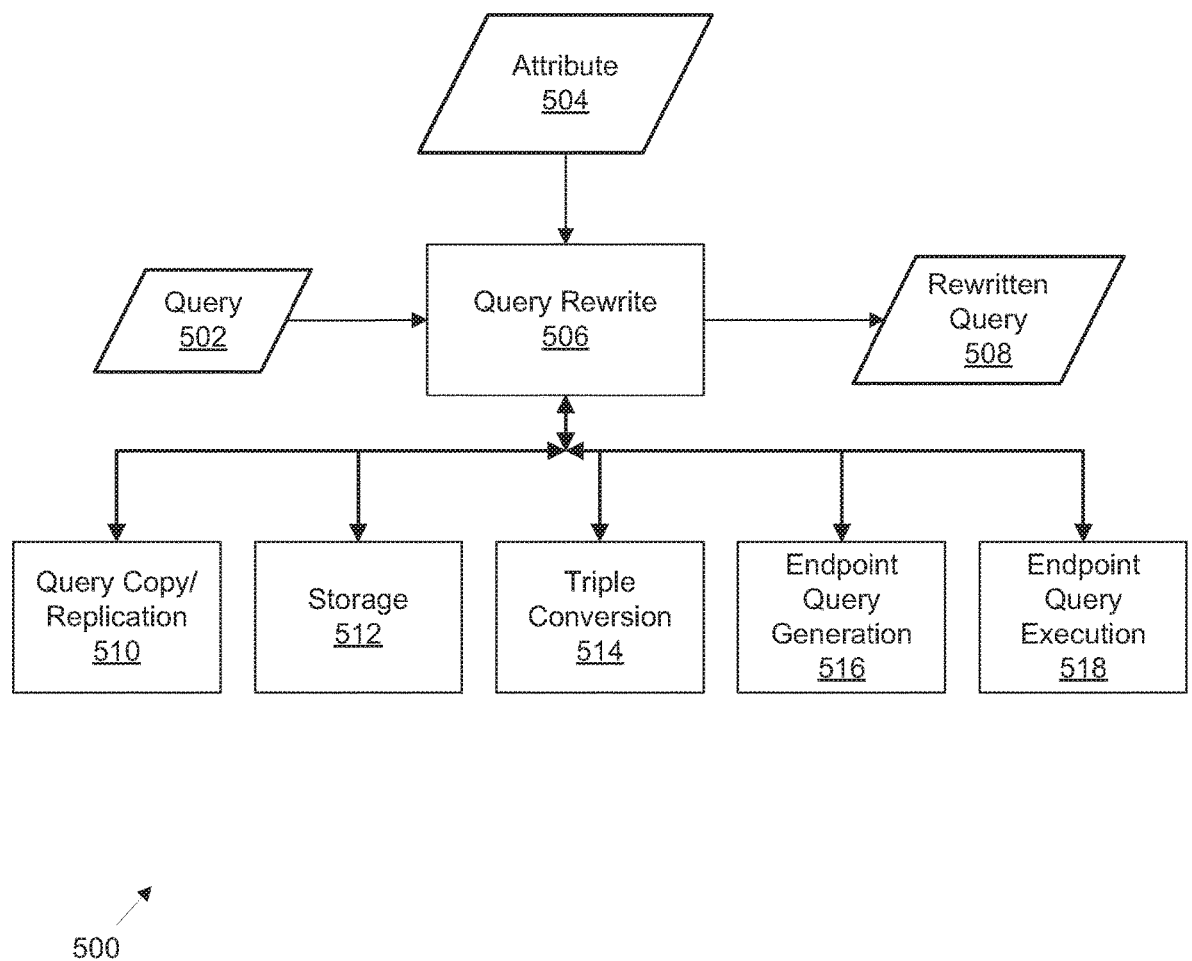
FIG. 5 illustrates an exemplary data operations model illustrating various processes for platform management of integrated access to public and privately-accessible datasets utilizing federated query generation and schema rewriting optimization.

FIG. 5 illustrates an exemplary data operations model illustrating various processes for platform management of integrated access to public and privately-accessible datasets utilizing federated query generation and schema rewriting optimization. Here, data operations model includes query data 502, attribute data 504, query rewrite process 506, rewritten query 508, and processes for query copy/replication 510, storage 512, triple conversion 514, endpoint query generation 516, and endpoint query execution 518. As shown, each of elements 502-518 may be a implemented as a process, computer program, software, firmware, hardware, circuitry, logic, or a combination thereof (hereafter "application") and, in some examples, may be written in Java® and/or JavaScript®, or any other programming or formatting language, without limitation or restriction. Elements 502-518 may be programmed, developed, or encoded using software programming techniques familiar to these programming and formatting languages or others, without restriction, regardless of whether object-oriented, structured, or unstructured. In some examples, query data 502 and query attribute data 504 are input to query rewrite process 506. Although not shown, query data 502 may be data that is inferred (by inference engine 214 (FIG. 2)) and converted into triples data (e.g., RDF triples) by conversion module 212 (FIG. 2). Likewise, attribute data 504 may be triple data that is converted from inferred data generated from inference engine 214 regarding one or more characteristics associated with query 502 (e.g., query 203 (FIG. 2)). Using triple data associated with a query (e.g., query 502, query 203 (FIG. 2)) and one or more attributes inferred from the query (i.e., by inference engine 214 (FIG. 2)), query rewrite process 506 may be an application, computer program, software, firmware, script, thread, multiple threaded program or application, distributed or cloud-based application, circuitry, logic, or a combination thereof, that is configured to generate a rewritten query (e.g., rewritten query 508) that may be executed against one or more databases. As proxy/endpoint server 206 (FIG. 2) is configured to execute rewritten query 508 against a given database and other proxy/endpoint servers (not shown) can be implemented to also execute other instances or versions of rewritten query 508 for different databases, formats, protocols, languages, schema, data models, object models, or the like. In so doing, platform 102 (FIG. 1) and application 201 (FIG. 2) can generate, execute, and manage multiple queries similar to a federated system by directing each rewritten query (i.e., rewritten query 508) to a proxy/endpoint server 206 that is configured or scripted to generate and execute a query (e.g., query 508) for a given query language or protocol (e.g., SQL, SPARQL, XPath, MDX, LDAP, Datalog, CQL, and various other structured or unstructured languages or protocols, without limitation or restriction). Some of the processes and data operations that support this functionality are shown and described herein connection with FIG. 5.

In some examples, query copy/replication 510 may be a process that is implemented by application 201 (FIG. 2) and configured to replicate or copy (hereafter, "replicate" and "copy" may be used interchangeably to the generation of a copy or replica of a query (e.g., query 203 (FIG. 2)), dataset (e.g., dataset 242 (FIG. 2)), rewritten query (e.g., rewritten query 244 (FIG. 2)), linked data graph (i.e., "graph"), object model, data model, or any other type of data instance that may be used, manipulated, modified, deleted, generated, created, or otherwise operated upon by application 201. Further, query copy/replication 510 may be implemented as a process that occurs before, during, after, or as a part of query rewrite 506. In some examples, query copy/replication 510 may be also be performed in parallel or serial with other processes or threads (e.g., storage 512, triple conversion 514, endpoint query generation 516, endpoint query execution 518, among others). In other examples, query/copy replication 510 may be designed, implemented, configured, or otherwise executed differently and is not limited to the examples shown and described.

When a replica is generated by query copy/replication 510, in some examples, storage 512 may be configured to run or execute as a process to store a generated copy of a query and the original query (i.e., master) in one or more databases associated with application 201 (FIG. 2) and as described above. Other data, including inferred data such as attribute or characteristic data, graphs, linked data, graph data, and the like may also be stored and retrieved using storage 512. As described previously, databases may include any type of data storage facility that is configured to physically, virtually, logically, or otherwise work with application 201 in a standalone, hosted, distributed, or cloud-based configuration.

Here, triple conversion 514 may be implemented as, for example, a process configured to convert query data into triples (e.g., RDF triples, items that are subject-predicate-object oriented, or another atomic format apart from those described herein). Data associated with a query may include query data received and parsed directly from, for example, query 203 (FIG. 2) or other data associated with characteristics or attributes of a query that may be inferred by inference engine 214 (FIG. 2). Triple data, once converted from query or attribute data, in some examples, may be stored in a similar manner using a process similar to that described above in connection with copy/replica storage 512. Triple data (e.g., query 502, attribute 504) may be used by query rewrite 506 to construct and generate rewritten query 508, which can be converted back from a triples-based format (e.g., RDF, or others) into another structured or unstructured data query language (e.g., SQL, SPARQL, and others) by an endpoint server (e.g., proxy/endpoint server 206 (FIG. 2)) that is configured to communicate with a given database, datastore, data network, or the like using, for example, endpoint query generation 516 as a process for doing so. For example, endpoint query generation 516 may be a process or set of processes used by application 201 (FIG. 2) as an instance running on proxy/endpoint server 206 and which is configured to execute a query using endpoint query execution 518 as a process or set of processes to do so. Rewritten queries (e.g., rewritten query 508) may be executed using endpoint query execution 518 as a process or set of processes that are configured to execute (i.e., run) against any public or private data network or secure data network such as those provided by Data.Gov, the U.S. Department of Defense, the National Institutes of Health, or other private, corporate, academic, non-profit, or other types of organizations or entities that have datasets. In some examples, application 201 and graph database engine 228 may be configured to generate, store, and modify graphs of linked data as datasets are identified by platform 102 (FIG. 1).

Here, some data networks may utilize SQL as a primary data storage and query language while others may use DMX for data mining purposes, and still others may use LDAP for querying services run over Transport Control Protocol/Internet Protocol (i.e., "TCP/IP"). In still other examples, proxy/endpoint server 206 may use different query languages and the processes described herein such as triple conversion 514, endpoint query generation 516, and endpoint query execution 518 are not limited to any particular language or version thereof. In other examples, the above-described processes may be designed, implemented, configured, or otherwise executed differently and are not limited to the examples shown and described.

Figure 6A:
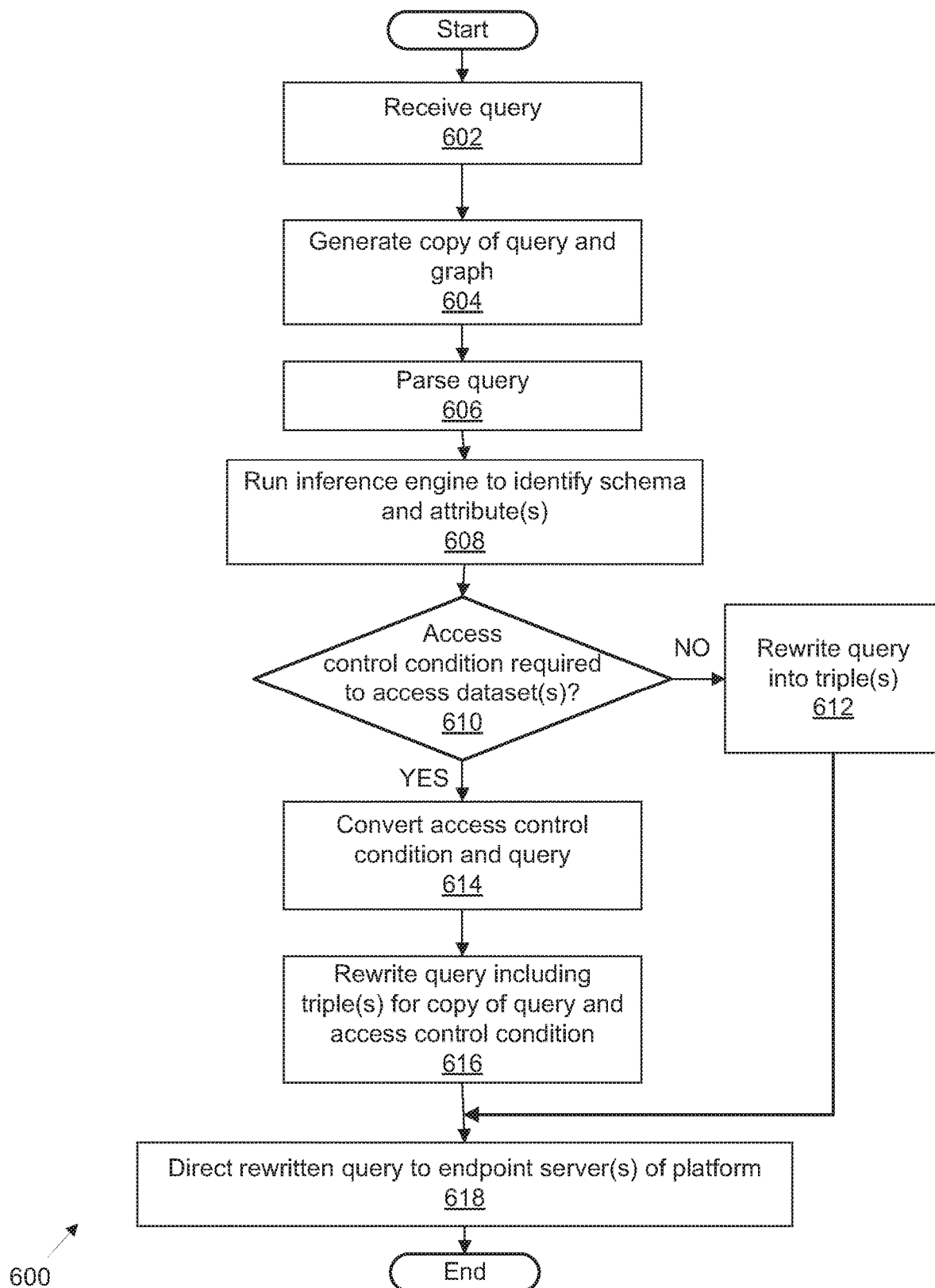
FIG. 6A illustrates an exemplary process flow for platform management of integrated access to public and privately-accessible datasets utilizing federated query generation and schema rewriting optimization.

FIG. 6A illustrates an exemplary process flow for platform management of integrated access to public and privately-accessible datasets utilizing federated query generation and schema rewriting optimization. Here, process 600 begins by receiving a query (602). Once received a copy (i.e., replica) is generated and a graph is created by, for example, graph database engine 228 (FIG. 2) (604). Once created, the original query (e.g., query 203 (FIG. 2)) may be stored as a master and the copy may also be stored, but in the same or a different location (i.e., in a different database). Further, any newly-generated or modified graphs and graph data may also be stored, either in the same, similar, or a different location than that of the master and the copy of query 203. Subsequent to generating the copy and the graph, process 600 may include parsing a copy of the query (606). Further, inference engine 214 (FIG. 2) may be directed by control data or signals from logic module 210 (FIG. 2) to determine and identify any attributes (i.e., characteristics) associated with a query, the queried (i.e., requested) dataset(s), any linked data that might suggest other datasets previously determined and identified to be related or similar to the data in the requested dataset (608). A determination is made as to whether any inferred attributes indicate whether there is an access control condition present, such as those described above (610). If no access control condition is found amongst the inferred attributes, then a rewritten query is generated by converting any query data and inferred attribute data into triples using a format such as RDF and then used to construct rewritten queries that can be formatted for specific types and query languages by proxy/endpoint servers (e.g., proxy/endpoint server 206 (FIG. 2) that are configured to be in data communication with various data networks (612).

Alternatively, in some examples, if an access control condition (e.g., such as those described above) is determined by inference engine 214 (FIG. 2), then the access control condition and the query data are converted into triples (as described herein) (614). The triple data is then used to generate a rewritten query (e.g., rewritten query 244 (FIG. 2), rewritten query 508 (FIG. 5)) that includes both the query and the access control condition (616). Once a query has been rewritten from triple data, regardless of whether an access control condition is inferred to be present among the attribute data of the original query, the rewritten query is directed to a given proxy/endpoint server (e.g., proxy/endpoint server 206 (FIG. 2) which converts the triples data into a language(s) and format(s) for the target or destination data network and database (618) after which process 600 ends. In some examples, rewritten queries having access control conditions are sent to private data networks to obtain datasets housed (i.e., stored) within (i.e., private datasets) and rewritten queries without access control conditions may be sent to public data networks to obtain datasets housed within (i.e., public datasets).

Alternative processes may be implemented other than the examples shown and/or described. For example, an alternative process may be included to parse a query to identify its various components and then determine what datasets are desired (i.e., targeted) for access. Once determined, the targeted dataset(s) can be evaluated further by inferring any attributes such as access control conditions. Access control conditions inferred may include, but are not limited to, checking token-based access controls for each targeted dataset and, if an access control condition or attribute indicates access is not authorized by data within the query, it is rejected and data is transmitted back to the user for display via, for example, display module 218 (FIG. 2). However, if a query does have an inferred attribute that is an access control condition that authorizes access, then a rewritten query may be generated at each proxy/endpoint server (e.g., proxy/endpoint server 206), which each represent an internal endpoint that is configured to transfer data with a given database engine (i.e., database or data network on which a target dataset is stored). Subsequently, rewritten queries or those parts of a rewritten query that differ due to the query language or format of a given destination database engine, database, datastore, or data network, may be sent to graph database engine 228 (FIG. 2) for updating one or more stored graphs associated with the original query (e.g., query 203 (FIG. 2)) or other graphs. In other words, process 600 and alternative processes such as those described above may be performed in order to enable, for example, proxy/endpoint server 206 (FIG. 2) to "issue" federated pieces of a query to internal graph database engines such as graph database engine 228 (FIG. 2). As used herein, "federation" may refer to an overall process or set of processes or techniques that are used to generate, manage, receive responses to, graph, track, and perform other processes related to executing a query against multiple incongruous and non-contiguous databases, database engines, or data, generally, of different formats, languages, structures (or lack thereof), and the like, while managing integrated and consolidated retrieval (e.g., fetch) of requested datasets in response to the query.

In other examples, the above-described process may be varied in function, order, procedure, and process, without limitation to any of the examples or accompanying descriptions.

Figure 6B:
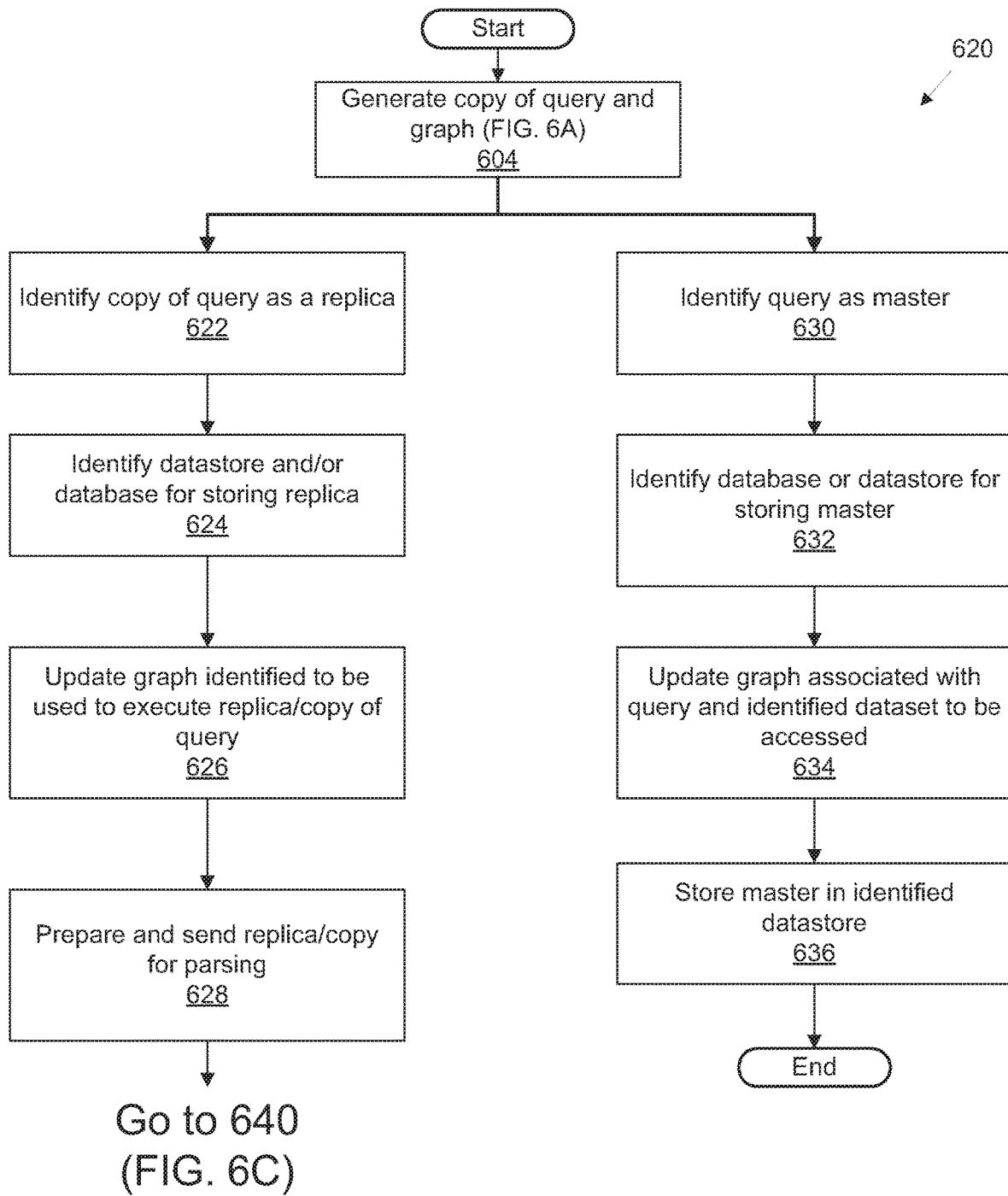
FIG. 6B illustrates a further exemplary process flow for platform management of integrated access to public and privately-accessible datasets utilizing federated query generation and schema rewriting optimization.

FIG. 6B illustrates a further exemplary process flow for platform management of integrated access to public and privately-accessible datasets utilizing federated query generation and schema rewriting optimization. Here, process 620 illustrates exemplary processes for managing query copies and masters and initiates by generating a copy of a query and creating a graph and graph data associated with the query and its copy (604). In some examples, process 620, for copies of queries, identifies the copy as a replica (622), identifies a database or datastore for storing the replica (624), updates the graph associated with the query to identify (i.e., through the use of metadata, tags, markers, or other elements that can be used to discretely distinguish a copy from a master) the copy or replica to be used for further data operations to be performed, for example, by platform 102 (FIG. 1) and/or application 201 (FIG. 2). Further, after updating the graph and graph data, the copy is made available for parsing by, for example, logic module 210 (FIG. 2) or the other elements of application 201.

Running as parallel processes to those used for handling query copies as described above, in some examples, a query may be identified as a master (630). Once identified, a database or datastore in data communication with application 201 (FIG. 2) is identified to store the master (632). Examples of databases or datastores that may be used to store a master are databases 220-224 (FIG. 2) or those described above in connection with platform 102 and FIG. 1. After identifying a database or datastore in which to store the master, the graph generated for the query is updated with the stored location of the master and the stored location of the dataset(s) to be retrieved (i.e., fetched) (634). After inferring this information (e.g., by running inference engine 214 against a master), the master is stored in the previously-identified database or datastore (636). In other examples, the above-described process may be varied in function, order, procedure, and process, without limitation to any of the examples or accompanying descriptions.

Figure 6C:
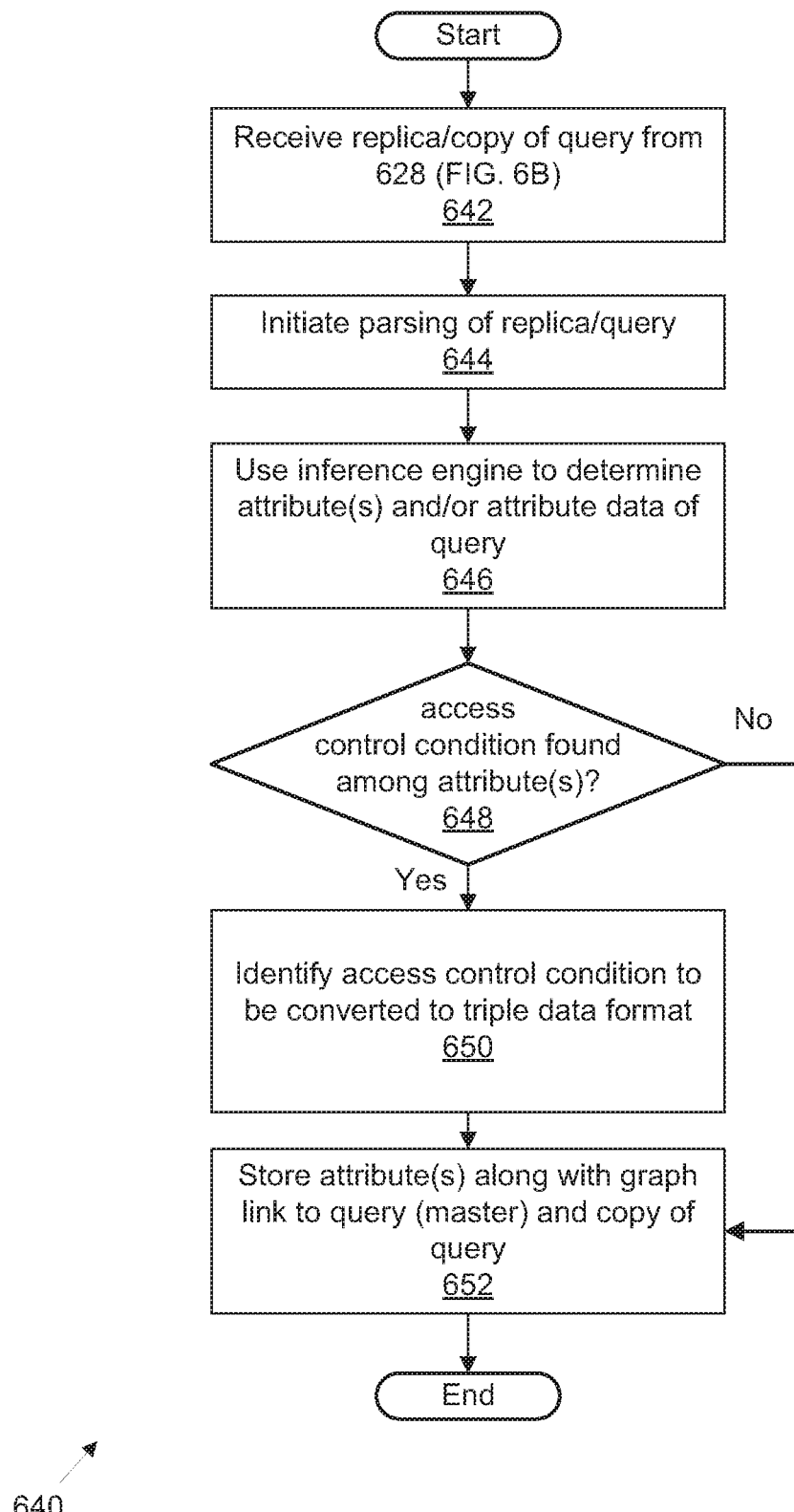
FIG. 6C illustrates another exemplary process flow for platform management of integrated access to public and privately-accessible datasets utilizing federated query generation and schema rewriting optimization.

FIG. 6C illustrates another exemplary process flow for platform management of integrated access to public and privately-accessible datasets utilizing federated query generation and schema rewriting optimization. Here, process 640 initiates (i.e., starts) by receiving a copy of a query from process 628 (FIG. 6B) (642). Once received, the copy is parsed by, for example, logic module 210 and one or more of elements 204-228 (FIG. 2) (644). Before, during, or after parsing (despite the exemplary process 640 illustrating parsing occurring beforehand), inference engine 214 (FIG. 2), for example, is invoked in order to determine whether any attributes and/or attribute data associated with the query can be determined from the copy of the query (646). A determination is then made to determine whether an access control condition may be present amongst the inferred attribute(s) and/or attribute data (i.e., as inferred by, for example, inference engine 214 (FIG. 2)) (648). If an access control condition is determined to be amongst the inferred attributes and/or attribute data, then the access control condition is identified for conversion to a triple data format (such as those described herein (e.g., RDF, SPARQL, subject-predicate-object)) (650). Once identified, the attributes and/or attribute data are stored in, for example, a database or datastore used by application 201 (FIG. 2), along with links in an updated graph (i.e., a data model of the query), which link the copy of the query and the master to the attribute(s) and/or attribute data (652). Alternatively, if no access control condition (as described in detail above) is found, then any attribute(s) and/or attribute data is stored with links in an updated graph, which link the copy of the query and the master to the attribute(s) and/or attribute data (652). In other examples, the above-described process may be varied in function, order, procedure, and process, without limitation to any of the examples or accompanying descriptions.

Figure 6D:
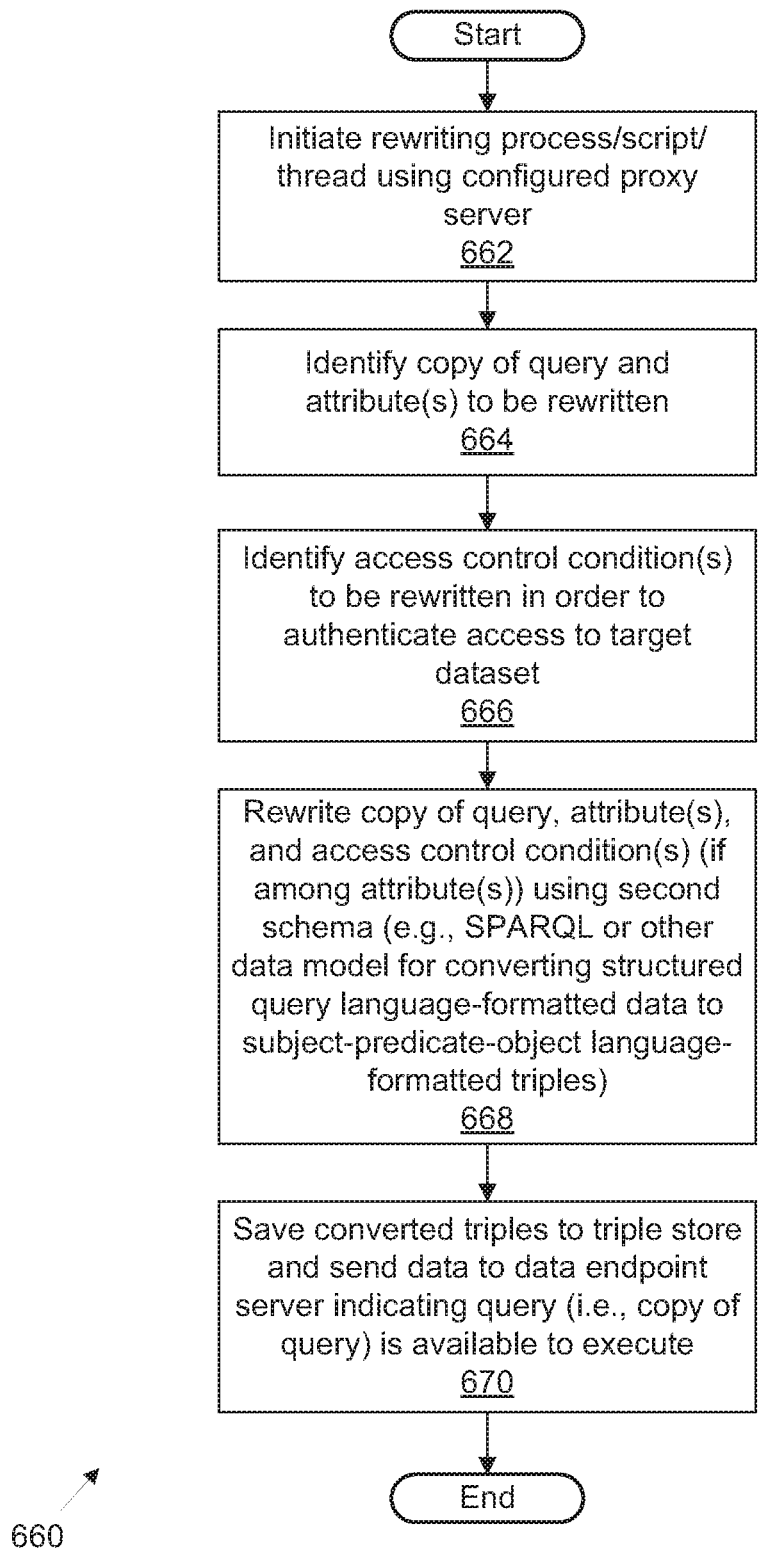
FIG. 6D illustrates an additional exemplary process flow for platform management of integrated access to public and privately-accessible datasets utilizing federated query generation and schema rewriting optimization.

FIG. 6D illustrates an additional exemplary process flow for platform management of integrated access to public and privately-accessible datasets utilizing federated query generation and schema rewriting optimization. Here, process 660 starts by initiating a rewriting process, script, thread, application, software, firmware, or the like, which has been configured to generate rewritten queries (e.g., rewritten query 244 (FIG. 2), rewritten query 508 (FIG. 5)) using a proxy/endpoint server (e.g., proxy/endpoint server 206 (FIG. 2)) (662). In some examples, application 201 (FIG. 2) may have one or more proxy/endpoint servers, each of which has been configured to rewrite a query by converting triple data into another data format for a query language used by a given data network and dataset. In some examples, the given data network and dataset may be those originally targeted by a query (e.g., query 203 (FIG. 2)). In other examples, a given data network and dataset may be different than those originally targeted by a query, but which may be determined to be related or similar to, associated with, or linked through analysis of a graph or graph data; the analysis being performed by, for example, graph database engine 228 (FIG. 2).

Referring back to FIG. 6D, a copy of a query and any inferred attributes or attribute data are identified for rewriting (664). More specifically, a copy of a query and inferred attributes and/or attribute data has been converted into triple data, as described above. Once identified, triple data and query data can be evaluated by logic module 210 (FIG. 2) to identify or determine whether an access control condition is an attribute of the query, the dataset, or the data network on which the dataset is stored and, if so, identifying the access control condition for inclusion in a rewritten query (e.g., rewritten query 244 (FIG. 2), rewritten query 508 (FIG. 5)) (666). Next, the copy of the query is converted (as part of the rewriting process) with any attributes or attribute data or access control conditions into triple data in accordance with a second data format (e.g., RDF, SPARQL, or the like) apart from that of the first data format of the original query (e.g., query 203). Once converted, the triple data is stored in a triple store (e.g. a datastore configured to store triple-formatted data (e.g., RDF), one or more of databases 220-224 (FIG. 2), or the like)) and control data and/or signals may be sent from conversion module 212, query engine 216, or logic module 210 to one or more proxy/endpoint servers (e.g., proxy/endpoint server 206 (FIG. 2)) to indicate that query 203 has been rewritten and is available for further query rewriting by an endpoint server for a given data network and/or database on which the requested dataset is stored (or on which linked datasets are stored, which may be retrieved and presented for display to a user (e.g., data scientist, researcher, scientist, academic researcher, or any other user or consumer of data using platform 102 (FIG. 1)) (670). In other examples, the above-described process may be varied in function, order, procedure, and process, without limitation to any of the examples or accompanying descriptions.

Figure 6E:
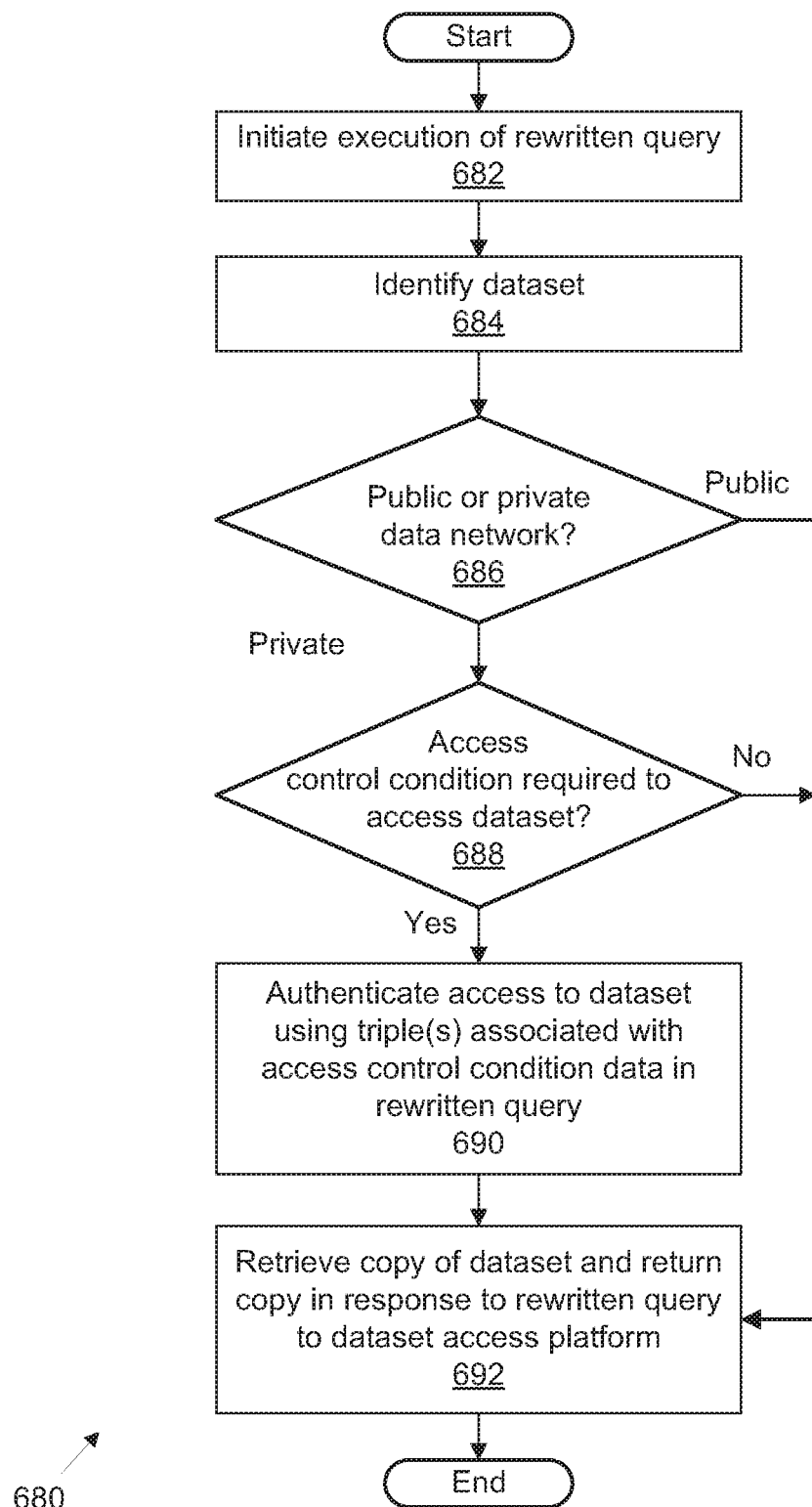
FIG. 6E illustrates yet a further exemplary process flow for platform management of integrated access to public and privately-accessible datasets utilizing federated query generation and schema rewriting optimization.

FIG. 6E illustrates yet a further exemplary process flow for platform management of integrated access to public and privately-accessible datasets utilizing federated query generation and schema rewriting optimization. Here, process 680 starts by initiating execution of a rewritten query (e.g., rewritten query 244 (FIG. 2), rewritten query 508 (FIG. 5)) (682). Next, a target dataset (e.g., dataset 242 (FIG. 2)) is identified for retrieval (i.e., fetch) (684). In some examples, a first determination is made as to whether a target dataset is being stored on a public (i.e., publicly-accessible, open, or access is not subject or dependent upon an access control condition such as those described above) or private (secure or subject to authorization or authentication, as described herein) data network (686). If the target dataset is stored on a private data network, then another determination is made as to whether an access control condition is required to access the target dataset (688). For example, although a given dataset may be hosted (i.e., stored, reposited, or otherwise housed) on a private data network, there may be an access control condition required to access both a private data network and a private dataset. In other examples, a private dataset may be hosted on a public network and, although an access control condition is not required to access the public data network, an access control condition may be required to access a private dataset stored thereon. While this example is not illustrated, it is neither limited nor restricted from the scope of the techniques discussed herein.

Referring back to FIG. 6E, if an access control condition has been detected or otherwise determined to be required for a private data network by, for example, inference engine 214 (FIG. 2) (i.e., based on inferring attributes or attribute data associated with a query (e.g., query 203)), then access to a private data network and a dataset may each require an access control condition, as described above. An access control condition (i.e., authenticating access to a private dataset) may be performed by including triple data associated with an access control condition to be converted and also included in a rewritten query (e.g., rewritten query 244 (FIG. 2), rewritten query 508 (FIG. 5)). Finally, upon completion of rewriting a query, as described above, a rewritten query may be executed by transmission from a proxy/endpoint server (e.g., proxy/endpoint server 206) to either a destination data network on which a target dataset is stored or to another data network(s) on which dataset(s) that may be linked to the requested dataset may also be stored, and retrieving the requested and/or linked dataset(s) (i.e., linked datasets may be those that are identified as being linked to a requested dataset due to linkages that are identifying in a linked data model such as a graph or graph data, which are generated, stored, indexed, and otherwise managed by graph database engine 228 (FIG. 2) (692).

In other examples, a public dataset may be stored on a public network and, if no access control condition is required, then platform 102 (FIG. 1) and/or application 201 (FIG. 2) and the elements described therewith may be configured to retrieve a requested and/or linked dataset(s) or a copy thereof. In other examples, the above-described process may be varied in function, order, procedure, and process, without limitation to any of the examples or accompanying descriptions.

Figure 7A:
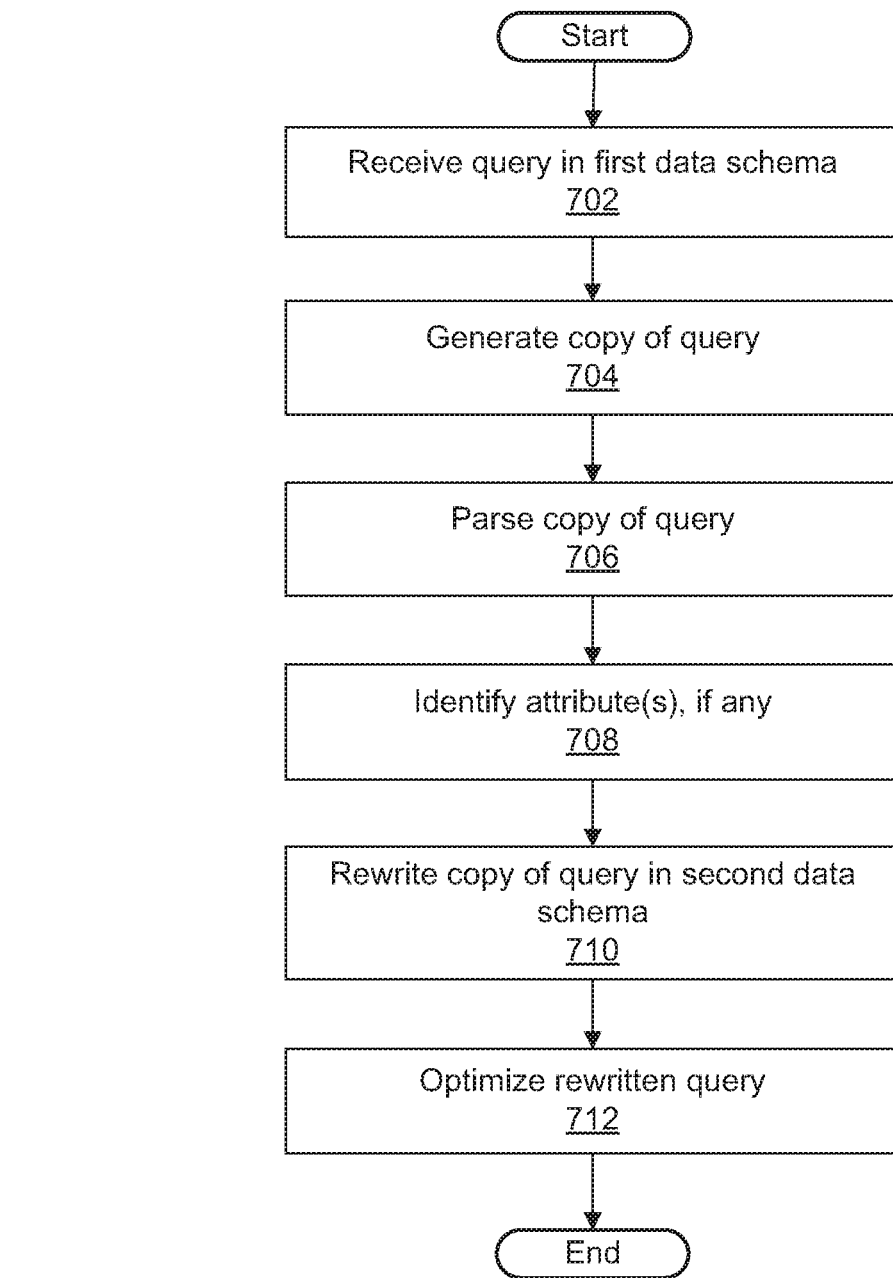
FIG. 7A illustrates an alternative exemplary process flow for platform management of integrated access to public and privately-accessible datasets utilizing federated query generation and schema rewriting optimization.

FIG. 7A illustrates an alternative exemplary process flow for platform management of integrated access to public and privately-accessible datasets utilizing federated query generation and schema rewriting optimization. Here, process 700 is initiated (i.e., starts) by receiving a query formatted or programmed in a first data schema (e.g., SQL) (702). A copy of the received query is generated (704) and then parsed (706). Resultant from the parsing, attributes are inferred (i.e., identified) by using various types of inference methods, techniques, and algorithms, some of which have been described herein (708). After identifying attributes associated with the query, a copy of the query data is rewritten into a second data format (e.g., RDF). Once converted into the second data format, the converted data (e.g., triple data) may be stored in a triple store for further rewriting and optimization (712). As used herein, "optimization" may refer to one or more actions that are taken during the generation of a rewritten query when, in addition to triple data associated with the original query, other data associated with inferred attributes such as access control conditions are also included (or the converted triple data associated with the inferred attributes and access control condition(s)) in a rewritten query, which may be generated by converting the triple data into a third data format, which may be the same, a similar, or a different data format than that of the original query (712). In other examples, the above-described process may be varied in function, order, procedure, and process, without limitation to any of the examples or accompanying descriptions.

Figure 7B:
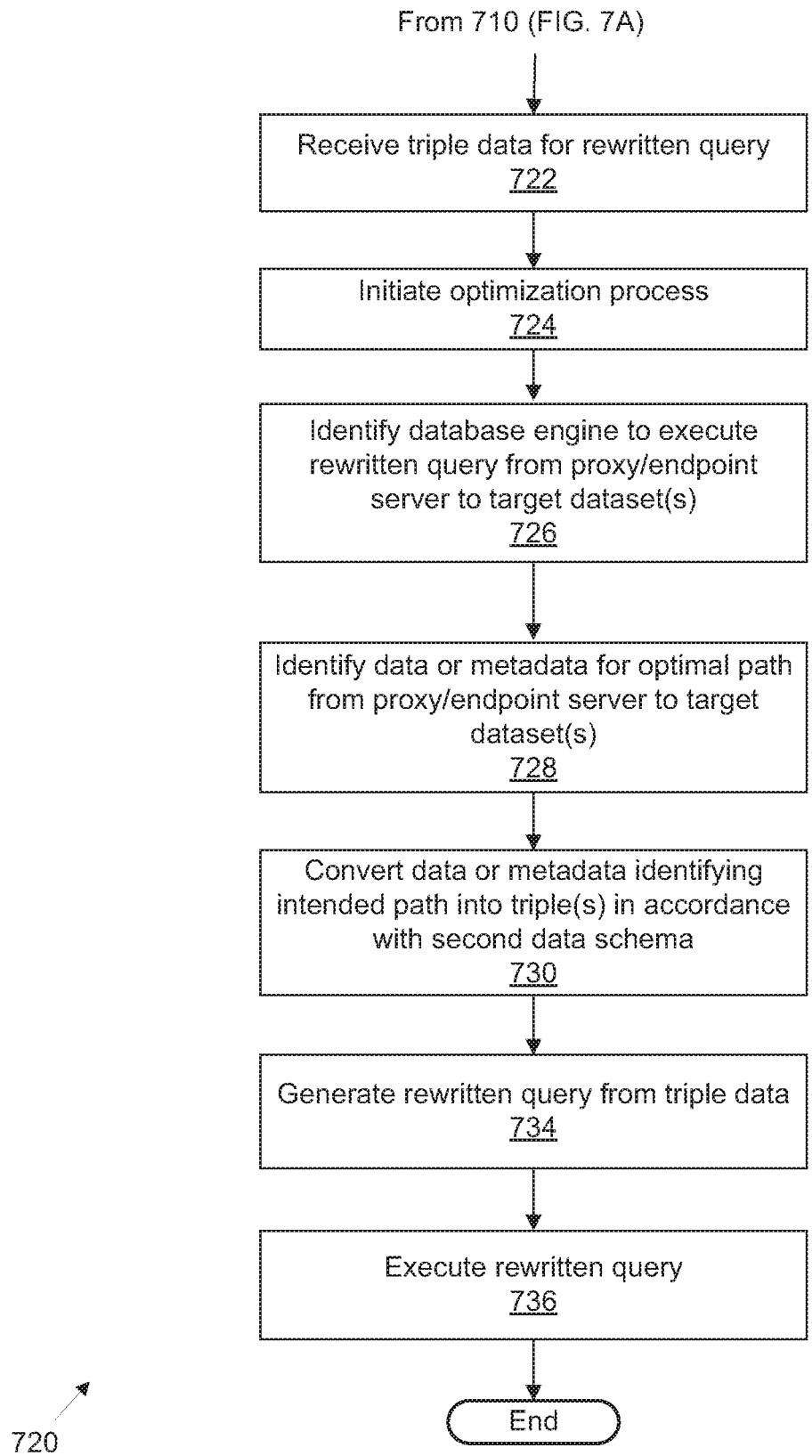
FIG. 7B illustrates a further alternative exemplary process flow for optimization of rewritten queries using platform management of integrated access to public and privately-accessible datasets utilizing federated query generation and schema rewriting optimization.

FIG. 7B illustrates a further alternative exemplary process flow for optimizing rewritten queries using platform management of integrated access to public and privately-accessible datasets utilizing federated query generation and schema rewriting optimization. Here, process 720 is a further detailed process or sub-process for optimizing a rewritten query as described above in connection with process step 712 (FIG. 7A). In some examples, triple data configured (e.g., tagged, marked, encoded, or otherwise identified) for a given rewritten query (e.g., rewritten query 244 (FIG. 2), rewritten query 508 (FIG. 5)) is received from step 710

(FIG. 7A) (722) and an optimization process is initiated when data or signals are sent from query engine 216 or conversion module 212 to logic module 210 (FIG. 2) to indicate that triple data has been received (724). As used herein, triple data received in step 722 may be associated with a query (e.g., query 203 (FIG. 2) or a copy of a query (not shown)) and/or any inferred attributes or attribute data determined by inference engine 214 (FIG. 2)).

Referring back to FIG. 7B, in some examples, a database engine intended to execute a rewritten query (i.e., the target of an originally-received query (e.g., query 203 (FIG. 2)) from platform 102 (FIG. 1) or application 201 (FIG. 2) may be identified (726). A database engine, in some examples, is identified as being assigned to execute queries for the target dataset(s) and to execute any access control conditions or mechanisms, if any. As used herein, a database engine may also refer to a data server or group of data servers, a data network, a datastore, or any type of database management system that is configured to manage the storage resource facility on which the queried or requested dataset is stored. Here, data or metadata is used to identify an "optimal" path from a proxy/endpoint server (e.g., proxy/endpoint server 206 (FIG. 2) to a target dataset(s) (728). As used herein, "optimal" may be used interchangeably with "best" or "least worst" to identify a path between platform 102 (FIG. 1) and a database engine configured to execute a query requesting data (e.g., executing a FETCH statement) to retrieve a given (i.e., target, targeted, requested, or queried) dataset. More specifically, an optimal path between platform 102 and a target dataset(s) may be a path graphed as a series of nodes from proxy/endpoint server 206 (FIG. 2) to a database engine configured to execute a query request to retrieve (e.g., FETCH in SQL, or the like) a target dataset(s). In some examples, an optimal path may be one that includes the least number of network nodes (e.g., servers, central offices, logical modules or nodes, endpoints, or the like) between proxy/endpoint server 206 and the target dataset. In other examples, an optimal path may be one that is defined by the least number of "hops" between nodes, topologically. In still other examples, an optimal path may be one that is determined based on the lowest level of latency in terms of data transmission to and from platform 102. In yet other examples, an optimal path may be determined based on real-time assessments of network and network equipment outages. In still further examples, an optimal path may also include nodes or network endpoints that are within the data network served by the database engine identified as being configured to execute a query to retrieve a target dataset(s). In yet other examples, an optimal path may be determined differently and is not limited to the examples provided herein. Data describing, defining, determining, or otherwise identifying an optimal path (i.e., path) may include data and/or metadata in any form or format, including, but not limited to XML, R, RDF, text, HTML, or any other type of programming or formatting language that may be used to generate data and metadata (i.e., information that is used to describe, characterize, attribute, or otherwise annotate data), without limitation or restriction.

Referring back to FIG. 7B, data and/or metadata that identifies a path between, for example, proxy/endpoint server 206 (FIG. 2) and a target dataset(s), may be converted into triple data in accordance with a second data schema (730). The converted triple data for the path, along with converted triple data for the query and any attributes or attribute data, may be retrieved by application 201 and used, by one or more elements (e.g., proxy/endpoint server 206, logic module 210, conversion module 212, query engine 216, among others) to generate a rewritten query by converting the triple data into another data schema that is used by a database engine in a destination data network on which a target dataset(s) or a linked dataset(s) is stored (734). Once generated, a rewritten query (e.g., rewritten query 244 (FIG. 2), rewritten query 508 (FIG. 5)) may be executed by proxy/endpoint server 206 and application 201 (FIG. 2). In other examples, the above-described process may be varied in function, order, procedure, and process, without limitation to any of the examples or accompanying descriptions.

Figure 8:
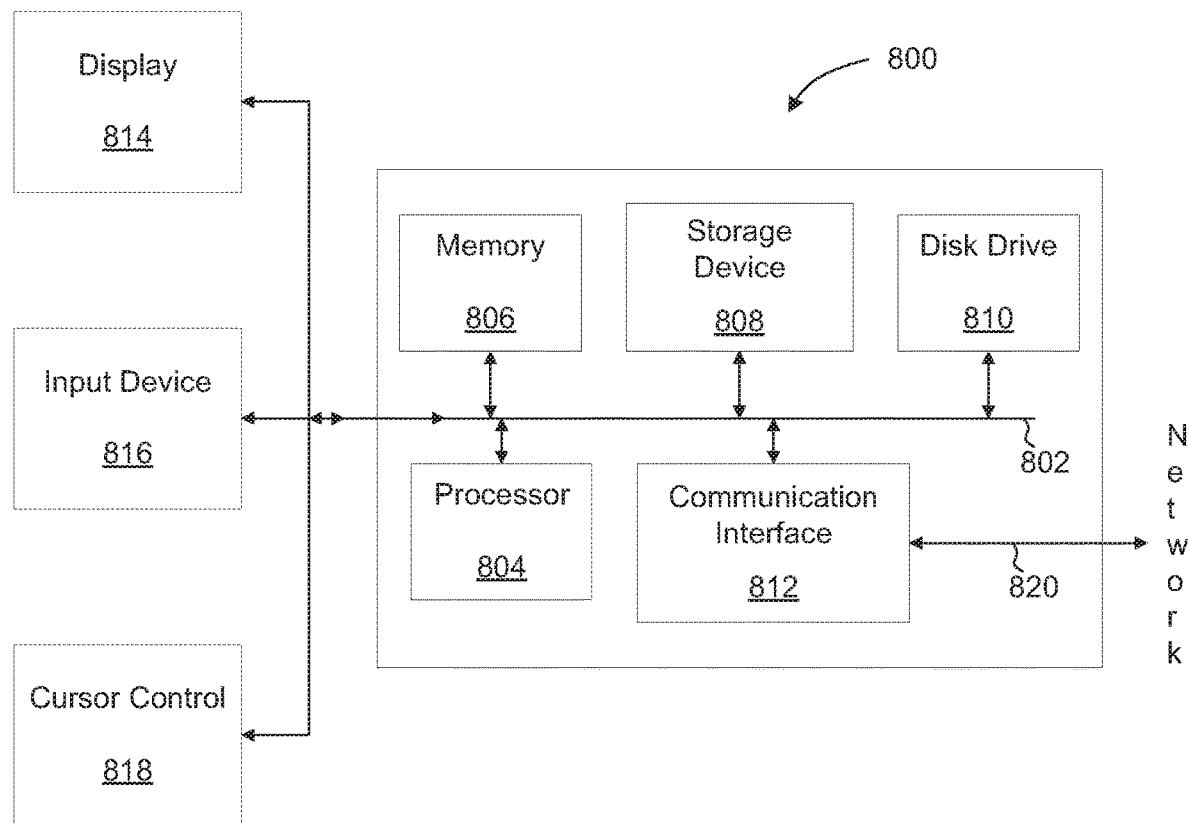
FIG. 8 illustrates an exemplary computer system suitable for platform management of integrated access to public and privately-accessible datasets utilizing federated query generation and schema rewriting optimization.

FIG. 8 illustrates an exemplary computer system suitable for platform management of integrated access to public and privately-accessible datasets utilizing federated query generation and schema rewriting optimization. In some examples, computer system 800 may be used to implement computer programs, applications, methods, processes, or other software to perform the above-described techniques. Computer system 800 includes a bus 802 or other communication mechanism for communicating information, which interconnects subsystems and devices, such as processor 804, system memory 806 (e.g., RAM), storage device 808 (e.g., ROM), disk drive 810 (e.g., magnetic or optical), communication interface 812 (e.g., modem or Ethernet card), display 814 (e.g., CRT or LCD), input device 816 (e.g., keyboard), and cursor control 818 (e.g., mouse or trackball).

According to some examples, computer system 800 performs specific operations by processor 804 executing one or more sequences of one or more instructions stored in system memory 806. Such instructions may be read into system memory 806 from another computer readable medium, such as static storage device 808 or disk drive 810. In some examples, hard-wired circuitry may be used in place of or in combination with software instructions for implementation.

The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks, such as disk drive 810. Volatile media includes dynamic memory, such as system memory 806.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by a single computer system 800. According to some examples, two or more computer systems 800 coupled by communication link 820 (e.g., LAN, PSTN, or wireless network) may perform the sequence of instructions in coordination with one another. Computer system 800 may transmit and receive messages, data, and instructions, including program, i.e., application code, through communication link 820 and communication interface 812. Received program code may be executed by processor 804 as it is received, and/or stored in disk drive 810, or other non-volatile storage for later execution. In other examples, the above-described techniques may be implemented differently in design, function, and/or structure and are not intended to be limited to the examples described and/or shown in the drawings.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
   receiving a query at a dataset access platform, the query being formatted according to a first data schema including a structured relational-based format, the query comprising data associated with a request to access a dataset;
   generating a copy of the query, the copy being identified as a master and configured to be stored in a datastore;
   updating a graph as a data model of the query to identify elements to distinguish the copy from the master;
   parsing the copy of the query in the first schema, the parsing being performed by an inference engine configured to identify the dataset, to infer an attribute associated with the query, and to generate one or more data links between the dataset and another dataset accessible by the dataset access platform;
   rewriting, using a proxy server, the copy of the query in a second schema including a triples-based format and, if the attribute indicates the query is configured to provide authentication data to access the dataset, the rewriting comprising converting the copy of the query into a triple and converting the attribute into another triple; and
   optimizing the rewriting, the optimizing comprising identifying a database engine to execute the query and converting other data to a further triple, the other data and the further triple being associated with a path configured to route the query or the copy of the query in the second schema including the triples-based format from the dataset access platform to retrieve query results from a target database configured to store the dataset as graph-based data.

2. The method of claim 1, wherein the converting the copy and the converting the attribute are performed using a framework.

3. The method of claim 1, further comprising determining whether the attribute comprises an access control condition associated with accessing the dataset.

4. The method of claim 1, wherein the inference engine is configured to generate the graph associated with the dataset, the another dataset, the data links, and the one or more property paths, the graph being stored in the datastore or another datastore.

5. The method of claim 1, wherein the database engine is configured to be topologically internal to a data network associated with the dataset access platform.

6. The method of claim 1, wherein the optimizing also comprises determining one or more property paths to the another dataset.

7. The method of claim 6, wherein the one or more property paths are determined by performing a comparison of another attribute associated with each of the one or more property paths to a threshold to identify an optimal path to run the query or the copy of the query.

8. The method of claim 1, wherein the access control condition is configured to authenticate the query to permit access to the dataset.

9. The method of claim 1, wherein the triple and the another triple are configured to be included in a rewritten query generated from the rewriting, the rewritten query being configured to be processed by one or more endpoints associated with the dataset access platform.

10. The method of claim 9, wherein at least one of the one or more endpoints comprise the database engine, the database engine being configured to execute the query, the copy of the query, or the rewritten query using the framework to perform data communication with the dataset or another data network topologically associated with the dataset.

11. The method of claim 1, wherein the database engine is configured to communicate data between the dataset access platform and another data network associated with the dataset.

12. The method of claim 1, wherein the database engine is configured to use the triple, the another triple, and the further triple to execute the copy to access the dataset and, after accessing the dataset, returning responsive data to the dataset access platform.

13. The method of claim 1, wherein the first schema including the structured relational-based format includes SQL query data.

14. The method of claim 1, wherein parsing the copy of the query comprises:
   parsing the query into a data structure including an abstract syntax tree associated with a target query language.

15. A system comprising:
   a memory including executable instructions; and
   a processor configured to execute the instructions to:
      receive a query at a dataset access platform, the query being formatted according to a first data schema including a structured relational-based format, the query comprising data associated with a request to access a dataset;
      generate a copy of the query, the copy being identified as a master and configured to be stored in a datastore;
      update a graph as a data model of the query to identify elements to distinguish the copy from the master;
      parse the copy of the query in the first schema, the parsing being performed by an inference engine configured to identify the dataset, to infer an attribute associated with the query, and to generate one or more data links between the dataset and another dataset accessible by the dataset access platform;
      rewrite, using a proxy server, the copy of the query in a second schema including a triples-based format and, if the attribute indicates the query is configured to provide authentication data to access the dataset, the rewriting comprising converting the copy of the query into a triple and converting the attribute into another triple; and
      optimize the rewriting, the optimizing comprising identifying a database engine to execute the query and converting other data to a further triple, the other data and the further triple being associated with a path configured to route the query or the copy of the query in the second schema including the triples-based format from the dataset access platform to retrieve query results from a target database configured to store the dataset as graph-based data.

16. The system of claim 15, wherein the converting the copy and the converting the attribute are performed using a framework.

17. The system of claim 15, wherein the processor is further configured to:
    determine whether the attribute comprises an access control condition associated with accessing the dataset.

18. The system of claim 15, wherein the inference engine is configured to generate the graph associated with the dataset, the another dataset, the data links, and the one or more property paths, the graph being stored in the datastore or another datastore.

19. The system of claim 15, wherein the database engine is configured to be topologically internal to a data network associated with the dataset access platform.

20. A non-transitory computer readable medium having one or more computer program instructions configured to perform a method, the method comprising:
    receiving a query at a dataset access platform, the query being formatted according to a first data schema including a structured relational-based format, the query comprising data associated with a request to access a dataset;
    generating a copy of the query, the copy being identified as a master and configured to be stored in a datastore;
    updating a graph as a data model of the query to identify elements to distinguish the copy from the master;
    parsing the copy of the query in the first schema, the parsing being performed by an inference engine configured to identify the dataset, to infer an attribute associated with the query, and to generate one or more data links between the dataset and another dataset accessible by the dataset access platform;
    rewriting, using a proxy server, the copy of the query in a second schema including a triples-based format and, if the attribute indicates the query is configured to provide authentication data to access the dataset, the rewriting comprising converting the copy of the query into a triple and converting the attribute into another triple; and
    optimizing the rewriting, the optimizing comprising identifying a database engine to execute the query and converting other data to a further triple, the other data and the further triple being associated with a path configured to route the query or the copy of the query in the second schema including the triples-based format from the dataset access platform to retrieve query results from a target database configured to store the dataset as graph-based data.

* * * * *